United States Patent
Kawamata et al.

(10) Patent No.: US 9,418,557 B2
(45) Date of Patent: Aug. 16, 2016

(54) FLEET OPERATION MANAGEMENT SYSTEM

(71) Applicant: Hitachi Construction Machinery Co., Ltd., Bunkyo-ku, Tokyo (JP)

(72) Inventors: Yukihiro Kawamata, Tokyo (JP); Mikio Bando, Tokyo (JP); Hiroshi Ogura, Tsuchiura (JP); Katsuaki Tanaka, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 130 days.

(21) Appl. No.: 14/377,378

(22) PCT Filed: Feb. 19, 2013

(86) PCT No.: PCT/JP2013/054042
§ 371 (c)(1),
(2) Date: Aug. 7, 2014

(87) PCT Pub. No.: WO2013/125538
PCT Pub. Date: Aug. 29, 2013

(65) Prior Publication Data
US 2016/0019792 A1    Jan. 21, 2016

(30) Foreign Application Priority Data

Feb. 22, 2012    (JP) ................. 2012-036859

(51) Int. Cl.
*G06F 7/70* (2006.01)
*G08G 1/00* (2006.01)
(Continued)

(52) U.S. Cl.
CPC .............. *G08G 1/20* (2013.01); *B60R 16/0236* (2013.01); *B60W 10/06* (2013.01); *B60W 10/11* (2013.01);
(Continued)

(58) Field of Classification Search
None
See application file for complete search history.

(56) References Cited

U.S. PATENT DOCUMENTS

| | | | |
|---|---|---|---|
| 7,940,741 B2 * | 5/2011 | Lee | .............. G08G 1/092 370/349 |
| 8,239,127 B2 | 8/2012 | Kono et al. | |

FOREIGN PATENT DOCUMENTS

| | | |
|---|---|---|
| JP | 10-76864 A | 3/1998 |
| JP | 2009-173143 A | 8/2009 |

(Continued)

OTHER PUBLICATIONS

English-language translation of International Preliminary Report on Patentability (PCT/IB/338 & PCT/IB/373), including Written Opinion (PCT/ISA/237), dated Sep. 4, 2014 (Six (6) pages).

(Continued)

*Primary Examiner* — Adam Alharbi
(74) *Attorney, Agent, or Firm* — Crowell & Moring LLP

(57) ABSTRACT

A fleet operation management system for a vehicle traveling on a predetermined travel route comprises: a storage unit (128, 142) which stores travel route information including the position, height and surface resistance of the vehicle's travel route; a speed prediction unit (102) which predicts future change in the speed of the vehicle coasting on the travel route based on the current position, the current speed, and the travel route information; and an operation timing calculation unit (104) which judges which of acceleration, deceleration and coasting should be performed at the current position based on the change in the coasting speed so that the vehicle speed after the lapse of a predetermined time will be within a predetermined range. This configuration makes it possible to properly judge which of the acceleration, the deceleration and the coasting should be performed on the vehicle's travel route from the viewpoint of fuel-efficient operation.

11 Claims, 17 Drawing Sheets

(51) Int. Cl.
*B60R 16/023* (2006.01)
*B60W 10/06* (2006.01)
*B60W 10/11* (2012.01)
*B60W 10/184* (2012.01)
*B60W 30/18* (2012.01)
*B60W 50/00* (2006.01)
*G07C 5/02* (2006.01)
*G07C 5/08* (2006.01)

(52) U.S. Cl.
CPC ....... *B60W 10/184* (2013.01); *B60W 30/18072* (2013.01); *B60W 50/0097* (2013.01); *G07C 5/02* (2013.01); *G07C 5/0816* (2013.01); *B60W 2520/10* (2013.01); *B60W 2550/142* (2013.01); *B60W 2550/143* (2013.01); *B60W 2550/402* (2013.01); *B60W 2720/10* (2013.01); *B60W 2720/103* (2013.01); *B60W 2720/106* (2013.01); *Y02T 10/84* (2013.01)

(56) References Cited

FOREIGN PATENT DOCUMENTS

| | | |
|---|---|---|
| JP | 2010-183687 A | 8/2010 |
| JP | 2011-53162 A | 3/2011 |
| JP | 2011-225103 A | 11/2011 |

OTHER PUBLICATIONS

Corresponding International Search Report dated Mar. 19, 2013 with English Translation (two (2) pages).
Japanese-language Written Opinion dated Mar. 19, 2013(PCT/ISA/237) (three (3) pages).

* cited by examiner

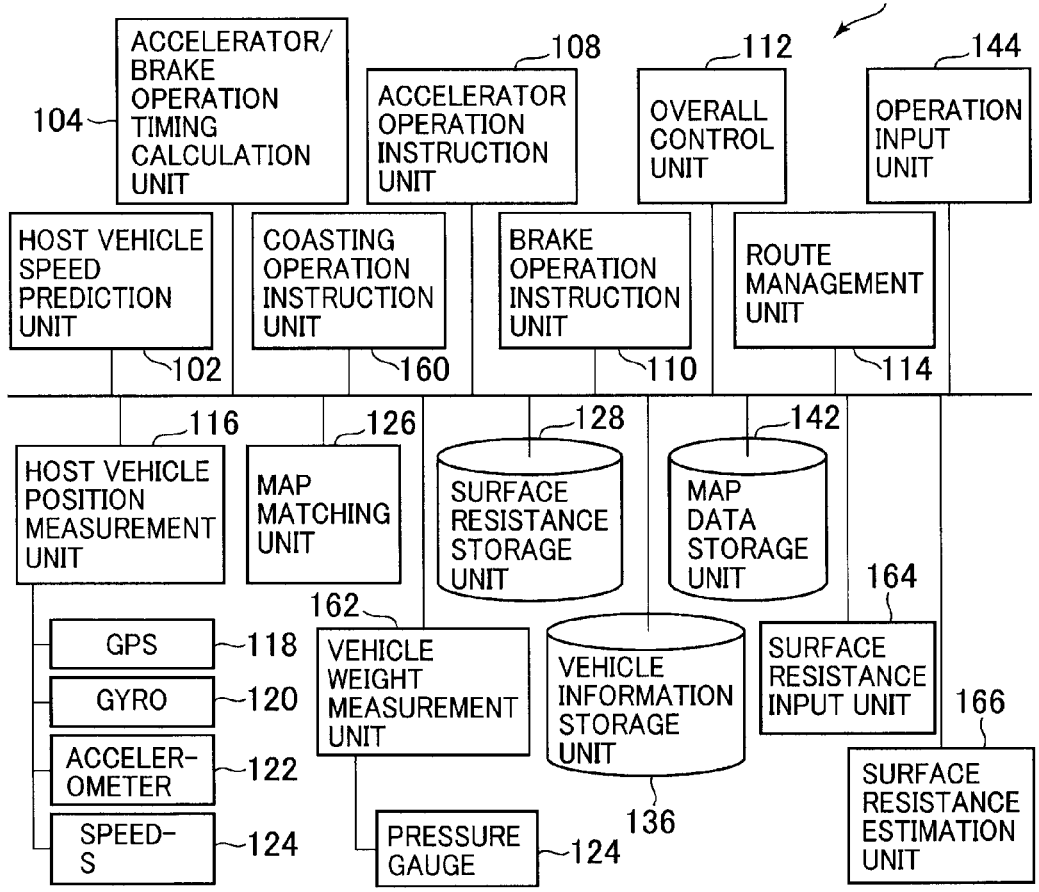
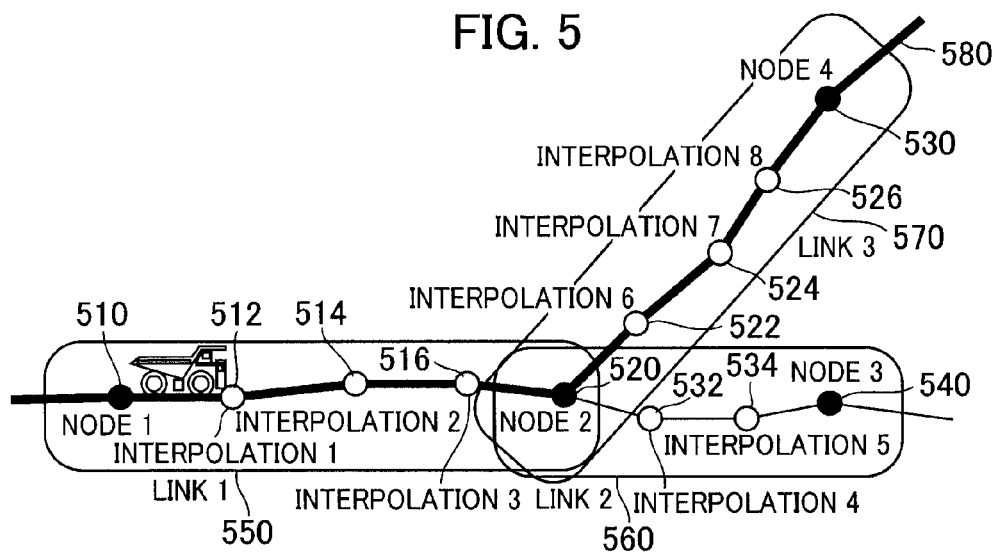

FIG. 6

ROAD LINK TABLE 600

| | | |
|---|---|---|
| 610 | LINK ID | 4byte |
| 615 | START POINT NODE ID | 4byte |
| 620 | END POINT NODE ID | 4byte |
| 625 | LINK DISTANCE | 4byte |
| 630 | START POINT NODE COORDINATES | X:4byte,Y:4Byte |
| 635 | END POINT NODE COORDINATES | X:4byte,Y:4Byte |
| 640 | INTERPOLATION POINT COUNT | 4Byte |
| 645 | NTERPOLATION POINT #1 COORDINATES | X:4byte,Y:4Byte |
| | ⋮ | ⋮ |
| 650 | NTERPOLATION POINT #n COORDINATES | X:4byte,Y:4Byte |

FIG. 7

ALTITUDE INFORMATION TABLE 800

| | | |
|---|---|---|
| 610 | LINK ID | 4byte |
| 615 | START POINT NODE ID | 4byte |
| 620 | END POINT NODE ID | 4byte |
| 625 | LINK DISTANCE | 4byte |
| 630 | START POINT NODE COORDINATES | X:4byte,Y:4Byte |
| 635 | END POINT NODE COORDINATES | X:4byte,Y:4Byte |
| 810 | START POINT ALTITUDE | 4Byte |
| 820 | END POINT ALTITUDE | 4Byte |
| 830 | ALTITUDE DIFFERENCE | 4Byte |

FIG. 8

SURFACE RESISTANCE TABLE 700

| | | |
|---|---|---|
| 610 | LINK ID | 4byte |
| 615 | START POINT NODE ID | 4byte |
| 620 | END POINT NODE ID | 4byte |
| 625 | LINK DISTANCE | 4byte |
| 630 | START POINT NODE COORDINATES | X:4byte,Y:4Byte |
| 635 | END POINT NODE COORDINATES | X:4byte,Y:4Byte |
| 710 | SURFACE RESISTANCE | 4Byte |

FIG. 9

VEHICLE INFORMATION TABLE 900

| | | |
|---|---|---|
| 905 | FRONTAL PROJECTED AREA | 4byte |
| 910 | Cd VALUE | 4byte |
| 915 | AIR DENSITY | 4byte |
| 920 | VEHICLE WEIGHT | 4byte |
| 925 | ROTATION-EQUIVALENT MASS | 4byte |

FLEET OPERATION MANAGEMENT SYSTEM

TECHNICAL FIELD

The present invention relates to a fleet operation management system for supporting fuel-efficient operation of vehicles such as mining dump trucks.

BACKGROUND ART

With the recent enhancement of awareness of environmental problems, a lot of efforts are being made to reduce the fuel consumption of vehicles such as motorcars, construction machines and dump trucks (e.g., mining dump trucks).

Technologies of this kind include, for example, applications (application programs) for providing a service of searching for a route that minimizes the fuel consumption. For example, JP-2011-53162-A discloses a car navigation system for presenting the driver with a travel route that minimizes the fuel consumption based on geographical features, traffic information, vehicle weight, and energy consumption characteristics of the engine/motor.

As a technology adopting a different approach, there exists a system which constantly monitors the fuel consumption of a vehicle and provides the driver with guidance to reduce the fuel consumption. For example, JP-10-76864-A discloses a vehicle operation management device which monitors the fuel consumption calculated during the traveling of the vehicle and issues an abnormality alarm when the fuel consumption reaches an alarm level.

Further, there has been disclosed an operation support device for a diesel-electric truck, comprising: a course information database storing course information on a course on which the truck travels; a vehicle body information database storing vehicle body information on the truck; a current position judgment unit which calculates current position information on the truck; means for calculating coasting start timing for achieving a target speed at a predetermined point in front of the current position based on the current position and speed of the truck and the target speed at the predetermined point by use of the databases and inputted information; and means for informing the driver of the coasting start timing according to the output of the calculation means (JP-2010-183687-A).

PRIOR ART LITERATURE

Patent Literature

Patent Literature 1: JP-2011-53162-A
Patent Literature 2: JP-10-76864-A
Patent Literature 3: JP-2010-183687-A

SUMMARY OF THE INVENTION

Problem to be Solved by the Invention

In systems monitoring the fuel consumption and issuing an alarm to the driver when the fuel consumption is significantly high (like the technology disclosed in JP-10-76864-A), the driver is allowed to notice his/her poor accelerator/brake work (ways of operating the accelerator and brake pedals) deteriorating the fuel efficiency. However, the driver cannot learn about concrete accelerator/brake work suitable for reducing the fuel consumption.

Further, just presenting the driver with a route minimizing the fuel consumption (like the technology disclosed in JP-2011-53162-A) does not necessarily achieve the intended fuel-efficient operation depending on the driver's accelerator/brake work. Since the accelerator/brake work greatly varies from driver to driver, this factor can deteriorate the fuel efficiency in a greater degree than the benefit of the fuel saving effect achieved by the route selection.

Furthermore, the technology disclosed in JP-2010-183687-A just indicates the start timing for the coasting operation, without clarifying start timing for acceleration operation and deceleration operation. Thus, this technology also does not let the driver learn about concrete accelerator/brake work suitable for reducing the fuel consumption. Especially, dump trucks do not mainly travel on paved roads, and thus the surface resistance on the travel route changes from hour to hour due to variations in weather, temperature change, water sprinkling by sprinkler trucks, etc. Calculating the coasting start timing based on the fixed travel course information (surface resistance, etc.) as in this technology involves a problem in that the accuracy of the timing calculation deteriorates when the road surface condition changes.

It is therefore the primary object of the present invention to provide a fleet operation management system that makes it possible to properly judge which of acceleration, deceleration and coasting should be performed during the traveling from the viewpoint of fuel-saving operation.

Means for Solving the Problem

To achieve the above object, the present invention provides a fleet operation management system for a vehicle traveling on a predetermined travel route, comprising: a storage unit which stores travel route information including a position, height and surface resistance of the travel route; and a calculation unit which predicts future change in a speed of the vehicle coasting on the travel route based on a current position and current speed of the vehicle and the travel route information and judges which of acceleration, deceleration and coasting of the vehicle should be performed at the current position based on the change in the coasting speed so that a predicted speed of the vehicle after the lapse of a predetermined time will be within a predetermined range.

Effect of the Invention

According to the present invention, which of acceleration, deceleration and coasting should be performed during the traveling can be judged properly from the viewpoint of fuel-saving operation, by which the fuel efficiency of vehicles can be improved.

BRIEF DESCRIPTION OF THE DRAWINGS

FIG. 4 is a block diagram of a fleet operation management system in accordance with a first embodiment of the present invention.

FIG. 5 is an explanatory drawing for explaining map data according to an embodiment of the present invention.

FIG. 6 is a schematic diagram showing a road link table stored in a map data storage unit 142.

FIG. 7 is a schematic diagram showing an altitude information table stored in the map data storage unit 142.

FIG. 8 is a schematic diagram showing a surface resistance table stored in a surface resistance storage unit 128.

FIG. 9 is a schematic diagram showing a vehicle information table stored in a vehicle information storage unit 136.

MODE FOR CARRYING OUT THE INVENTION

Figure 1:
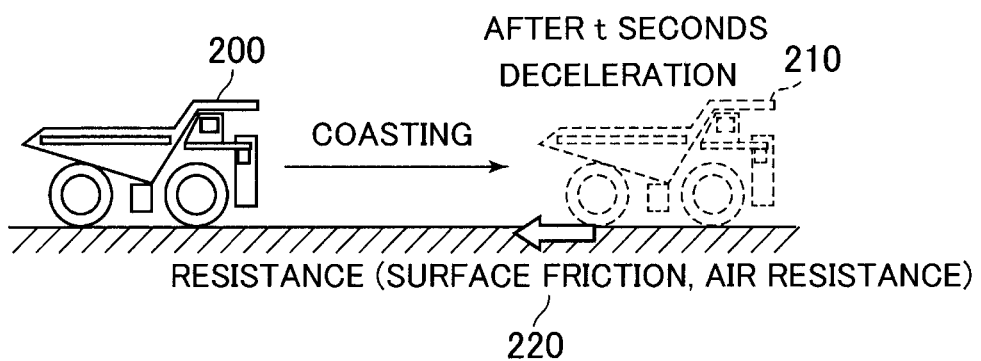
FIG. 1 is a schematic diagram showing a state of a mining dump truck coasting on a level ground.

Referring now to the drawings, a description will be given in detail of preferred embodiments of the present invention. The following explanation will be given about cases where the operation management system is employed for mining dump trucks among various types of vehicles.

FIG. 1 is a schematic diagram showing a state of a mining dump truck coasting on a level ground (gradient: 0) with no fuel injection (traveling with inertial energy with the accelerator pedal and the brake pedal both released). As shown in FIG. 1, in the case where the mining dump truck 200 coasts on a level ground, the mining dump truck 210 after t seconds becomes slower than the mining dump truck 200 at the original point due to the resistance 220 such as surface resistance and air resistance.

Figure 2:
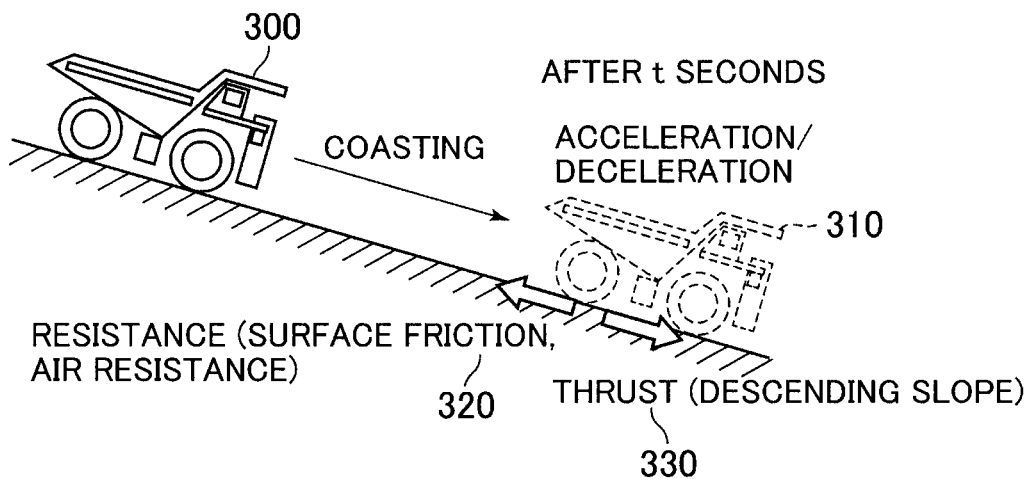
FIG. 2 is a schematic diagram showing a state of a mining dump truck coasting on a descending slope.

FIG. 2 is a schematic diagram showing a state of a mining dump truck coasting on a descending slope. As shown in FIG. 2, in the case where the mining dump truck 300 coasts on a descending slope, the mining dump truck accelerates/decelerates when the gradient of the descending slope is relatively high/low. The acceleration/deceleration is caused by the resistance 320 (surface resistance, air resistance, etc.) and the thrust 330 due to the height difference of the descending slope. Thus, the mining dump truck 310 after t seconds becomes slower/faster than the mining dump truck 300 at the original point if the thrust 330 is greater/less than the resistance 320.

The present invention supports the fuel-efficient operation by promoting the suppression of wasteful fuel injection by calculating the distance for which the vehicle can travel (coast) until the vehicle speed decreases to 0 (coastable distance), acceleration/deceleration/coasting timing in the traveling on a road such as a descending slope, and so forth.

Figure 3:
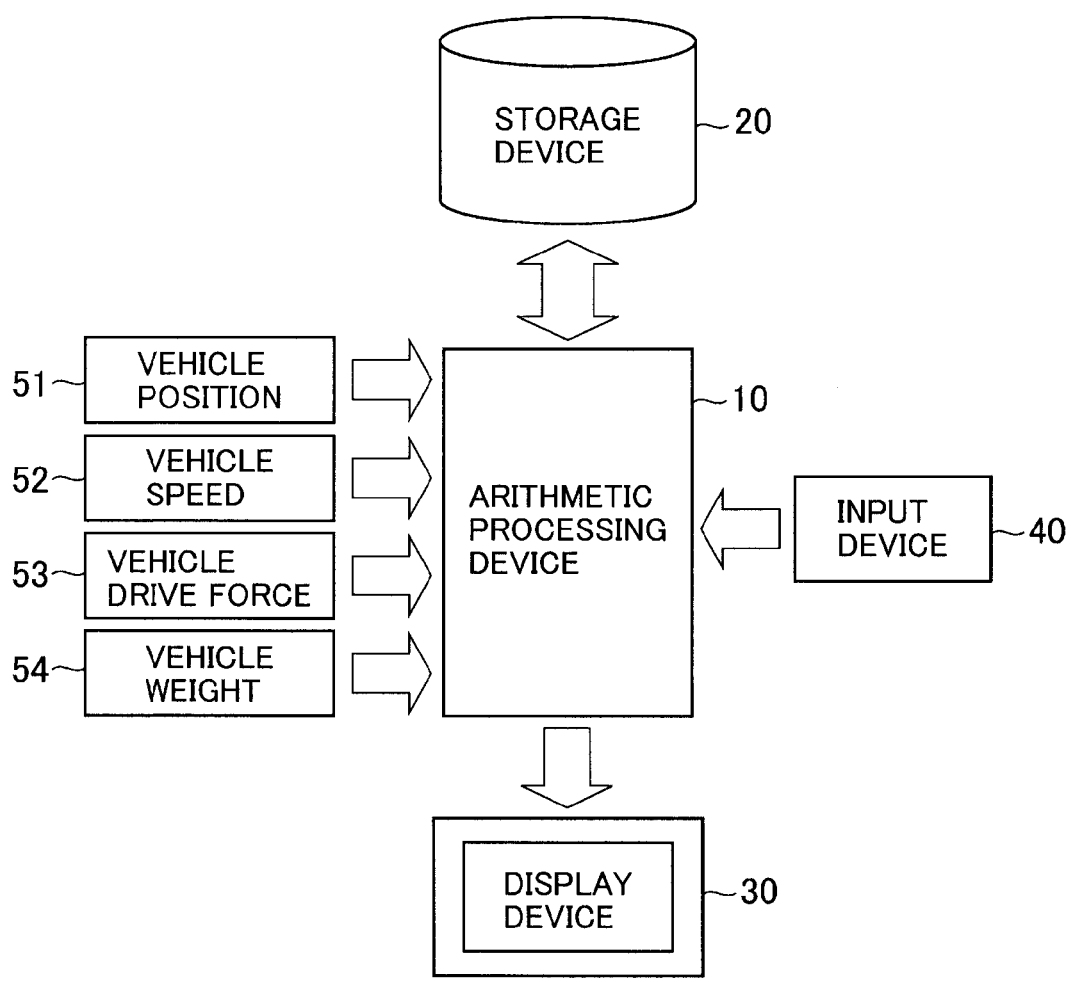
FIG. 3 is a schematic block diagram of a fleet operation management system in accordance with an embodiment of the present invention.

FIG. 3 is a schematic block diagram showing a configuration that is common to mining dump truck operation management systems according to the embodiments of the present invention. The fleet operation management system shown in FIG. 3 is used for supporting the fuel-efficient operation of one or more mining dump trucks in manned or unmanned operation. The fleet operation management system comprises an arithmetic processing device 10 (e.g., CPU) as calculation means (calculation unit) for executing various programs, a storage device 20 (e.g., semiconductor memory (ROM, RAM, flash memory, etc.) and magnetic storage device (hard disk drive, etc.)) as storage means (storage unit) for storing the programs and various data, a display device 30 (e.g., liquid crystal monitor) for displaying information such as results of processing by the arithmetic processing device 10, and an input device 40 (e.g., pointing device (mouse, touch panel, etc.), keyboard, etc.) as input means (input unit) for letting the operator (e.g., driver or manager of the mining dump truck) input information to the operation management system. Incidentally, while only one of each device 10. 20, 30, 40 is shown in the example of FIG. 3, the example is not meant to restrict the number and the installation position of each device in the embodiments.

Inputted to the fleet operation management system shown in FIG. 3 are the current position 51 of a certain mining dump truck (vehicle), the current speed 52 of the vehicle, the current drive force 53 of the vehicle, and the gross weight (or load weight on the bed) 54 of the vehicle (the gross vehicle weight as the sum of the vehicle weight of the mining dump truck, the load weight, etc. will be expressed simply as "vehicle weight" in the following explanation for the sake of simplification). For example, a GPS receiver 118 explained later is usable as means for detecting the current position 51, a speedometer (speed sensor) 124 explained later is usable as means for detecting the current speed 52, an engine torque sensor is usable as means for detecting the drive force 53, and pressure sensors for detecting the pressures of suspension cylinders of the mining dump truck are usable as means for detecting the vehicle weight 54.

The storage device 20 has prestored travel route information including the position (planar information) and the height (altitude information) of the travel route of the vehicle and surface resistance values of the travel route, vehicle information including the frontal projected area of the vehicle, the air density and the vehicle weight 54, and so forth. The surface resistance values of the travel route may also be calculated based on the speed 52 and the drive force 53 of the vehicle on the travel route. The surface resistance value calculated in regard to each position may be stored in the storage device 20 as the surface resistance value at each position.

The arithmetic processing device 10 predicts future change in the speed of the vehicle coasting on the travel route based on the current position 51, the current speed 52, and the travel route information stored in the storage device 20. Then, the arithmetic processing device 10 executes a process of judging which of (1) acceleration (accelerator pedal depressing operation), (2) deceleration (brake pedal depressing operation) and (3) coasting (traveling with inertial energy with the accelerator pedal and the brake pedal both released) should be performed at the current position based on the previously predicted change in the coasting speed so that the vehicle speed or the vehicle speed change rate (over time) after the lapse of a predetermined time will be within a predetermined range.

As an example of the calculation process, the arithmetic processing device 10 may judge that the acceleration should be performed if the predicted speed after the lapse of a predetermined time from the present time (time of control) is a first threshold value or lower, the deceleration should be performed if the predicted speed is a second threshold value (>first threshold value) or higher, and the coasting should be performed if the predicted speed is higher than the first threshold value and lower than the second threshold value. The arithmetic processing device 10 may also be configured to judge that the acceleration should be performed if the change rate (rate of change over time) of the predicted speed is a third threshold value (different from the first and second threshold values) or lower, the deceleration should be performed if the change rate of the predicted speed is a fourth threshold value (>third threshold value) or higher, and the coasting should be performed if the change rate of the predicted speed is higher than the third threshold value and lower than the fourth threshold value.

The gross vehicle weight of the mining dump truck also changes greatly with the change in the load weight on the bed (i.e., the load). Therefore, the arithmetic processing device 10 is desired to make the prediction of the change in the coasting speed of the vehicle in consideration of the vehicle weight. The arithmetic processing device 10 may also calculate the coastable distance from the current position and change in acceleration based on the change in the coasting speed.

Based on the result of the judgment by the arithmetic processing device 10, the display device 30 displays a screen for notifying the driver which of (1) depressing the accelerator pedal, (2) depressing the brake pedal, and (3) releasing the accelerator pedal and the brake pedal should be performed at a predetermined position on the travel route. The fleet operation management system may also be equipped with a voice guidance device 1300 for vocally notifying the driver which of the three operations (1)-(3) should be performed (see FIG. 14, for example) instead of the display device 30.

It is also possible to have the display device 30 display a map for indicating the travel route while also displaying the coastable distance on the map. Further, acceleration sections and deceleration sections may also be displayed on the map based on the change in the acceleration. Furthermore, predicted vehicle speed at each boundary between the acceleration and deceleration sections may also be displayed.

In the following, specific contents of the embodiments according to the present invention will be described.

FIG. 4 is a block diagram of a mining dump truck operation management system according to a first embodiment of the present invention. In this embodiment, the operation management system is installed in an in-vehicle terminal system of a mining dump truck. In the in-vehicle terminal system, an accelerator operation instruction (accelerator pedal depressing instruction), a brake operation instruction (brake pedal depressing instruction), or a coasting operation instruction (accelerator/brake pedal releasing instruction) is presented to the operator of the mining dump truck via notification means such as the display device 30 and/or the voice guidance device 1300.

The storage device 20 shown in FIG. 3 functions as a map data storage unit 142, a vehicle information storage unit 136 and a surface resistance storage unit 128 in the in-vehicle terminal system 100 shown in FIG. 4. The input device 40 functions as an operation input unit 144 and a surface resistance input unit 164. The arithmetic processing device 10 functions as a host vehicle position measurement unit 116, a surface resistance estimation unit 166, a vehicle weight measurement unit 162, a speed prediction unit 102, an operation timing calculation unit 104, an accelerator operation instruction unit 108, a brake operation instruction unit 110, a coasting operation instruction unit 160, a map matching unit 126, a route management unit 114 and an overall control unit 112.

The map data storage unit 142 has stored map data regarding the position and the height of each road related to the travel route (transportation path) of the mining dump truck as the travel route information on the mining dump truck. In this embodiment, as indicated in FIGS. 5, 6 and 7 which will be explained later, the road shape is defined by a plurality of nodes represented by (X, Y) coordinate points and a set of links (road links) each connecting two of the nodes. Each node is associated with altitude information (height information). Each link is associated with altitude difference information representing the altitude difference between the two nodes.

The map data handled in this embodiment will be explained below referring to FIG. 5. FIG. 5 is an explanatory drawing for explaining the map data according to an embodiment of the present invention. As shown in FIG. 5, the map data handled in this embodiment is expressed by nodes and links. The position of each node is represented by two-dimensional coordinates in the latitude direction and the longitude direction. A link is segmented at road changing points. The changing point can be, for example, a road branching point, a point where the road gradient changes from positive (ascending) to negative (descending) or from negative to positive, a point where the road width changes, a point where the surface resistance changes, or a point where a link reaches a certain length. Each link has been assigned a link ID as a number unique to the link, while each node has been assigned a node ID as a number unique to the node (see FIG. 6).

In the example shown in FIG. 5, a link 1 (550), a link 2 (560) and a link 3 (570) are connected together at a node 2 (520) serving as a branching point. Each link is provided with a node at its start point and end point. The link 1 (550) is provided with a node 1 (510) at its start point and the node 2 (520) at its end point. The link 2 (560) is provided with the node 2 (520) at its start point and a node 3 (540) at its end point. The link 3 (570) is provided with the node 2 (520) at its start point and a node (530) at its end point.

Each link is further provided with interpolation points for expressing the road shape. The position of each interpolation point is represented by two-dimensional coordinates in the latitude direction and the longitude direction similarly to the nodes. The link 1 (550) has three interpolation points (interpolation point 1 (512), interpolation point 2 (514), interpolation point 3 (516)) and its road shape is expressed by using the start point node, the end point node and the three interpolation points. The link 2 (560) has two interpolation points (interpolation point 4 (532), interpolation point 5 (534)) and its road shape is expressed by using the start point node, the end point node and the two interpolation points. The link 3 (570) has three interpolation points (interpolation point 6 (522), interpolation point 7 (524), interpolation point 8 (526)) and its road shape is expressed by using the start point node, the end point node and the three interpolation points.

The travel route of the mining dump truck can be expressed as a set of links. In FIG. 5, the travel route of the mining dump truck is indicated by a thick line. Specifically, the travel route in FIG. 5 represents a path extending through the link 1 (550), turning left at the point of the node 2, and heading for the link 3 (570). In this case, the travel route is expressed as a set of links such as the link 1 (550) and the link 3 (570).

FIG. 6 is a schematic diagram showing a road link table as a set of map data stored in the map data storage unit 142. The road link table 600 shown in FIG. 6 includes a link ID 610 of each road link, a start point node ID 615 indicating the ID of the node as the start point of each road link, an end point node ID 620 indicating the ID of the node as the end point of each road link, a link distance 625 indicating the length of each road link, a start point node coordinates 630 indicating the two-dimensional coordinates of the start point node in the latitude direction and the longitude direction, an end point node coordinates 635 indicating the two-dimensional coordinates of the end point node in the latitude direction and the longitude direction, an interpolation point count 640 indicating the number of interpolation points (as coordinate points for expressing the road link shape) existing between the start point node 615 and the end point node 620, an interpolation point #1 coordinates 645 indicating the two-dimensional coordinates of the first interpolation point in the latitude direction and the longitude direction, and an interpolation point #n coordinates 650 indicating the two-dimensional coordinates of the n-th interpolation point in the latitude direction and the longitude direction. It is assumed that the same number of interpolation points as the interpolation point count 640 (the number of interpolation points) have been stored in the road link table.

FIG. 7 is a schematic diagram showing an altitude information table as a set of map data stored in the map data storage unit 142. Elements in FIG. 7 equivalent to those in FIG. 6 are assigned the already used reference characters and repeated explanation thereof is omitted for brevity (ditto for subsequent figures).

The altitude information table 800 shown in FIG. 7 includes a start point altitude 810 indicating the altitude of the start point node of each road link, an end point altitude 820 indicating the altitude of the end point node of each road link, and an altitude difference 830 indicating the altitude difference of the end point altitude relative to the start point altitude. As shown in FIG. 7, each node in each road link is associated with the altitude information (height information), and each road link is associated with the altitude difference information regarding the two modes. Incidentally, it is assumed here that each road link is formed so that the altitude of one of the start/end point nodes is relatively higher than that of the other node.

The surface resistance storage unit 128 has stored a surface resistance table 700 (containing the surface resistance value assigned to each road link) as a type of the travel route information on the mining dump truck. FIG. 8 is a schematic diagram showing the surface resistance table 700 stored in the surface resistance storage unit 128. As shown in FIG. 8, the surface resistance table 700 includes a surface resistance 710 indicating the surface resistance value of each road link. The value of the surface resistance 710 is appended/updated according to the inputs from the surface resistance input unit 164 and the surface resistance estimation unit 166.

The vehicle information storage unit 136 has stored a vehicle information table 900 containing information on the mining dump truck. FIG. 9 is a schematic diagram showing the vehicle information table 900 stored in the vehicle information storage unit 136. As shown in FIG. 9, the vehicle information table 900 includes a frontal projected area 905 indicating the frontal projected area of the vehicle, a Cd value 910 indicating the air resistance of the vehicle, an air density 915 regarding the environment in which the vehicle travels, a vehicle weight 920 indicating the gross weight of the vehicle, and a rotation-equivalent mass 925 indicating the rotation-equivalent mass of the vehicle. The vehicle weight 920 stores the vehicle weight 54 measured by the vehicle weight measurement unit 162. The vehicle weight 54 changes depending on the load weight on the bed (a case where the mining dump truck is carrying soil or ore, a case where no load is on the bed, etc.), and thus the vehicle weight 54 is updated each time.

The operation input unit 144 is a component for receiving inputs according to operations by the operator (e.g., driver of the mining dump truck) via various operating devices. The surface resistance input unit 164 is a component through which the surface resistance values of the vehicle's travel route are inputted. The surface resistance values are inputted via an electronic file storing surface resistance values regarding a particular area or the entire area of a mine, for example. The electronic file may also be inputted from another terminal that is wirelessly connected with the in-vehicle terminal system 100. The surface resistance values inputted through the surface resistance input unit 164 can be newly stored in the surface resistance storage unit 128 while being associated with road links (link IDs), or used for updating the surface resistance values already stored in the surface resistance storage unit 128. The surface resistance values may also be inputted by the operator through the operation input unit 144 based on various information sources describing surface resistance values.

The host vehicle position measurement unit 116 is a component for executing a process of calculating the position of the host vehicle (in which the system has been installed). The host vehicle position measurement unit 116 is connected with a GPS receiver 118 for measuring the absolute position of the host vehicle based on signals received from GPS (Global Positioning System) satellites, a gyro sensor (angular speed detector) 120 for measuring angular speed to be used for estimating the traveling direction of the host vehicle, an accelerometer (acceleration detector) 122 for measuring the acceleration of the host vehicle in the longitudinal direction, the transverse direction and the vertical direction, and a speedometer (speed detector) 124 for measuring the current speed of the host vehicle. The host vehicle position measurement unit 116 estimates the host vehicle position (position of the host vehicle) by using absolute position information from the GPS receiver 118, angular speed information from the gyro sensor 120, acceleration information from the accelerometer 122, and speed information from the speedometer 124.

The map matching unit 126 is a component for executing a process of placing the host vehicle position on the map by matching the shape of the travel locus of the host vehicle determined from the host vehicle positions estimated by the host vehicle position measurement unit 116 with the shape of the map data (road link set) stored in the map data storage unit 142 (map matching process). The host vehicle position on a road link can be calculated by this process.

The route management unit 114 is a component for checking and managing whether the host vehicle position is situated on the previously set travel route or not based on the calculation result by the map matching unit 126 and the road links. When the host vehicle position is on the travel route, the route management unit 114 manages the travel route from the position to the destination by using the road links. In contrast, when the host vehicle position is not on the travel route, the route management unit 114 scans road link sets in the vehicle's traveling direction to the end point of the road (e.g., loading site or unloading site of ore or soil) and sets a new route as a set of the link IDs of the road link set (set of road links) acquired as the result of the scan. Incidentally, the setting of the travel route may also be made according to the operator's input through the operation input unit 144 or according to information downloaded from a terminal in a station (vehicle management center) wirelessly connected with the in-vehicle terminal system 100.

The surface resistance estimation unit 166 is a component for executing a process of estimating the surface resistance at the point where the vehicle is traveling based on the acceleration of the vehicle inputted from the accelerometer 122 and information on the drive force 53 of the vehicle. The surface resistance value estimated by the surface resistance estimation unit 166 is outputted to and stored in the surface resistance storage unit 128 while being associated with the ID of the road link where the vehicle is traveling.

The vehicle weight measurement unit 162 is a component for executing a process of measuring the vehicle weight of the mining dump truck based on input values from the pressure sensors for detecting the suspension cylinder pressures of the mining dump truck, for example. The vehicle weight changes depending on the loading status of the bed. The vehicle weight calculated by the vehicle weight measurement unit 162 is outputted to and stored in the vehicle information storage unit 136.

The host vehicle speed prediction unit 102 is a component for executing a process of predicting the change in the speed of the host vehicle in the case of the coasting (with no fuel injection) based on a fuel consumption prediction model expressed in terms of the energy of the vehicle (e.g., the sum of potential energy, velocity energy, air resistance energy and surface resistance energy), road gradient determined from the altitude information stored in the map data storage unit 142, and so forth. Concrete methods for the prediction of the vehicle speed change will be explained later.

The accelerator/brake operation timing calculation unit 104 is a component for executing a process of judging which of the acceleration, the deceleration and the coasting should be performed at the vehicle's traveling position (current position) based on the vehicle speed change predicted by the host vehicle speed prediction unit 102 and further executing a process of figuring out whether the present time corresponds to accelerator pedal depressing timing (acceleration operation timing), brake pedal depressing timing (deceleration operation timing), or accelerator/brake pedal releasing timing (coasting operation timing) based on the result of the judgment. Concrete methods employed by the accelerator/brake operation timing calculation unit 104 will be explained later.

The accelerator operation instruction unit 108 is a component for executing a process of instructing (prompting) the operator to depress the accelerator pedal via the display device 30, the voice guidance device 1300, or the like when the operation timing calculation unit 104 judges that the vehicle's current position corresponds to the accelerator pedal depressing timing. Concrete examples of the notification by use of the display device 30 and the voice guidance device 1300 will be described later.

The brake operation instruction unit 110 is a component for executing a process of instructing (prompting) the operator to depress the brake pedal via the display device 30, the voice guidance device 1300, or the like when the operation timing calculation unit 104 judges that the vehicle's current position corresponds to the brake pedal depressing timing. Concrete examples of the notification by use of the display device 30 and the voice guidance device 1300 will be described later.

The coasting operation instruction unit 160 is a component for executing a process of instructing (prompting) the operator to release the accelerator pedal and the brake pedal via the display device 30, the voice guidance device 1300, or the like when the operation timing calculation unit 104 judges that the vehicle's current position corresponds to the accelerator/brake pedal releasing timing. Concrete examples of the notification by use of the display device 30 and the voice guidance device 1300 will be described later.

The overall control unit 112 is a component for executing the overall control of the in-vehicle terminal system 100.

Figure 10:
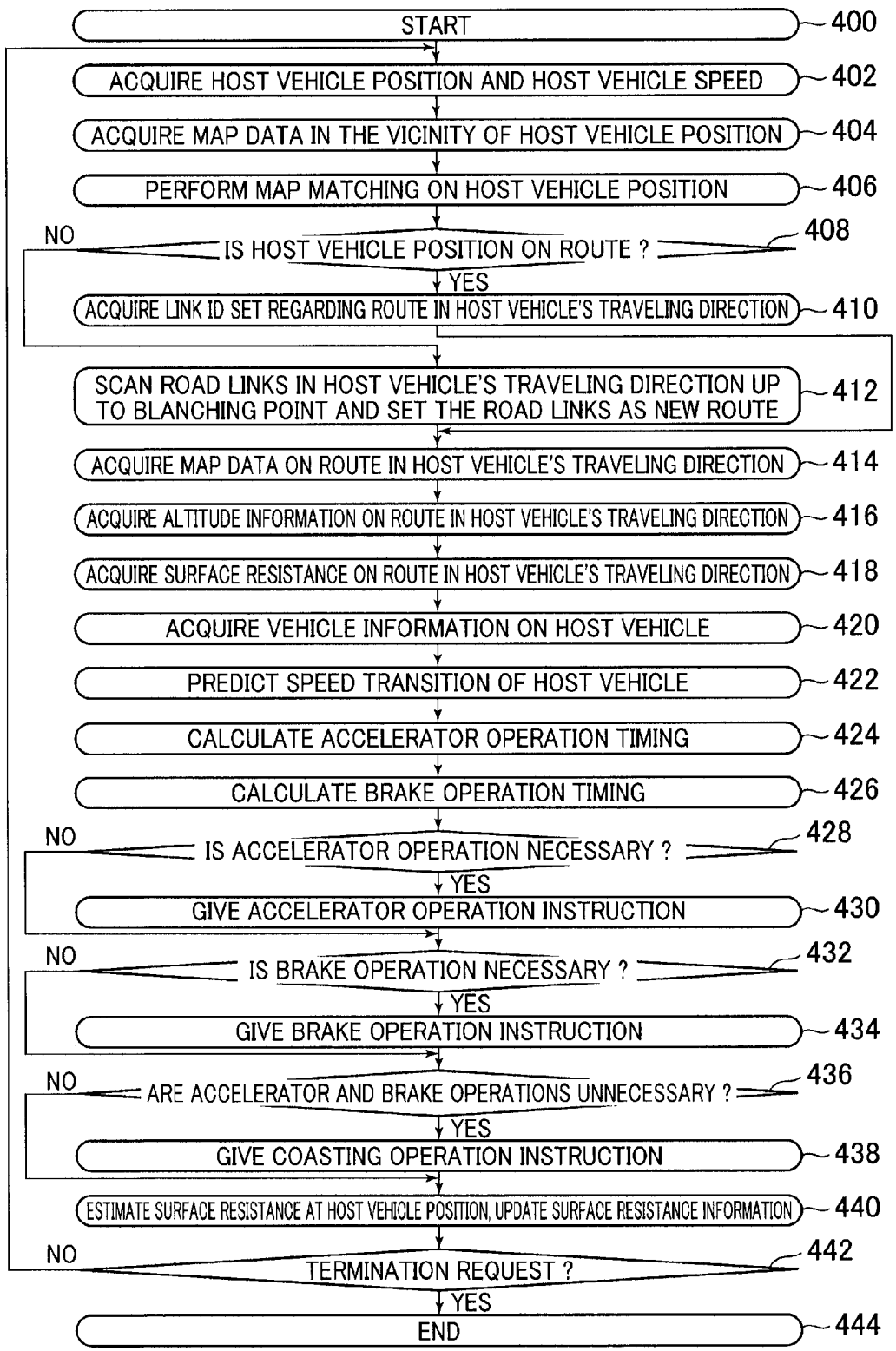
FIG. 10 is a flow chart of a process executed by the fleet operation management system in accordance with the first embodiment of the present invention.

FIG. 10 is a flow chart of a process executed by the fleet operation management system in accordance with the first embodiment of the present invention. In the first step 400 in FIG. 10, an initial setting process for setting the travel route of the mining dump truck, setting the surface resistance regarding the travel route, etc. is executed. The setting of the travel route may either be made manually according to the operator's input through the operation input unit 144 or automatically according to information downloaded from another terminal (e.g., terminal in the vehicle management center) wirelessly connected with the in-vehicle terminal system 100. The setting of the surface resistance regarding the travel route may either be made via an electronic file storing surface resistance values or according to the operator's input through the operation input unit 144. It is also possible to input surface resistance values of the entire route, or exclusively input surface resistance values of the route's particular sections in which the surface resistance has changed, that are downloaded from another terminal wirelessly connected with the in-vehicle terminal system 100. The inputted surface resistance is outputted to and stored in the surface resistance storage unit 128.

In step 402, the host vehicle position is acquired by the host vehicle position measurement unit 116. In this step, the host vehicle position measurement unit 116 acquires the absolute position of the host vehicle (in terms of the latitude and longitude) measured by the GPS receiver 118, acquires the angular speed from the gyro sensor 120, acquires the acceleration of the host vehicle in the longitudinal direction, the transverse direction and the vertical direction from the accelerometer 122, and acquires the speed from the speedometer 124. The host vehicle position is estimated by integrating these pieces of information together.

In step 404, a request for map information in the vicinity of the host vehicle position estimated in the step 402 is sent to the map data storage unit 142, and a set of road links around of the host vehicle position is acquired from the map data stored in the map data storage unit 142. It is assumed here that a road link set included in an area necessary for the map matching executed in the subsequent step 406 (e.g., road links within at least 500 m of the host vehicle) is acquired. Incidentally, the acquisition of the road link set can be achieved by acquiring the IDs of the road links included in the necessary area.

In step 406, the map matching unit 126 executes the map matching process by using the travel locus of the host vehicle determined from the host vehicle positions estimated by the host vehicle position measurement unit 116 and road line shapes determined from the road link set acquired in the step 404. By the map matching process, a road line shape closest to the travel route is extracted and the host vehicle position is placed on a road link included in the road line shape. Further, the link ID assigned to the road link (on which the host vehicle position is placed) is acquired.

In step 408, the route management unit 114 judges whether or not the host vehicle position acquired by the map matching process (step 406) is on the travel route that has been set in the step 400. When the route management unit 114 judges that the host vehicle is on the travel route, the process is advanced by the overall control unit 112 to step 410. In the step 410, the route management unit 114 acquires a set of link IDs of the route (road links) in front of the host vehicle from the road link set regarding the travel route set in the step 400.

In contrast, when the route management unit 114 judges that the host vehicle is not on the travel route in the step 408, the process is advanced by the overall control unit 112 to step 412. In the step 412, the route management unit 114 scans (searches for) a branching point that exists in the vehicle's traveling direction and that connects to the original travel route set in the step 400 based on the link ID of the road link (on which the host vehicle exists) acquired by the map matching process of the step 406. When a branching point is found successfully, the route management unit 114 acquires a set of link IDs regarding a road link set that extends from the host vehicle position to the original destination via the branching point. When no branching point is found, the route management unit 114 scans (searches for) a road link set that extends to the end point of a road existing in the vehicle's traveling direction (e.g., loading site or unloading site of ore or soil) and acquires a set of link IDs regarding the road link set.

In step 414, the road link set corresponding to the link ID set acquired in the step 410 or 412 is acquired from the map data storage unit 142. In step 416, the altitude information regarding the link ID set acquired in the step 410 or 412 is acquired from the map data storage unit 142. In step 418, the surface resistance values regarding the link ID set acquired in the step 410 or 412 are acquired from the map data storage unit 142. In step 420, the vehicle information on the host vehicle is acquired from the vehicle information storage unit 136.

In step 422, the host vehicle speed prediction unit 102 predicts the host vehicle's speed change on the travel route by using the host vehicle speed information acquired in the step 402, the host vehicle position on the link acquired by the map matching process of the step 406, the road link set of the route in front of the host vehicle acquired in the step 414, the altitude information on the route in front of the host vehicle acquired in the step 416, the surface resistance of the route in front of the host vehicle acquired in the step 418, and the vehicle information on the host vehicle acquired in the step 420.

The speed change is predicted by using a calculation formula that is designed to set the energy balance (regarding the surface resistance, altitude change, air resistance and acceleration/deceleration in the coasting of the mining dump truck) at 0. This host vehicle speed change calculation formula will be explained below by using the following expression:

$$v_{i+1} = \sqrt{v_i - \frac{2\mu_i Mg v_i T + 2Mg c v_i T/100 + \rho S C d v_i^2 T}{M+m}}$$

In the above expression, $v_i$ represents the average speed (m/s) in a section i on the travel route, T represents the sampling time (sec), $\mu_i$ represents the surface resistance in the section i, $\rho$ represents the air density (kg/m$^3$), S represents the vehicle's frontal projected area (m$^2$), Cd represents the vehicle's Cd value, M represents the vehicle weight (kg), m represents the rotation-equivalent mass (kg), $c_i$ represents the gradient (%) of the travel route, and g represents the acceleration of gravity.

The speed change is calculated by setting the sampling time T at a constant value, defining the present time as i=0, defining T seconds later as i=1, defining 2T seconds later as i=2, and so forth. In the above expression, $v_0$ represents the current speed, $\mu$ represents the surface resistance at the current position, and $c_0$ represents the gradient at the current position. The air density $\rho$, the frontal projected area S, the gross vehicle weight M, the rotation-equivalent mass m and the Cd value are assumed to be constant.

By using this expression, speed change (every T seconds) in a time line along the travel route until the speed vi decreases to 0 or speed change (every T seconds) in a time line regarding the entire travel route is calculated. After calculating the speed change, the process advances to step S424.

In the step 424, the accelerator/brake operation timing calculation unit 104 calculates the accelerator operation timing by using the speed change (every T seconds) calculated in the step 422. The operation timing calculation unit 104 in this embodiment judges that the accelerator operation is necessary when the predicted speed drops quickly or falls below a lower limit value. Specifically, the operation timing calculation unit 104 estimates that acceleration is necessary (i.e., judges that the accelerator operation is necessary) when the deviation between the current speed and the predicted speed after the lapse of a predetermined time (e.g., 10 seconds) (change rate of the predicted speed over time) represents deceleration and the speed deviation is within a threshold value, and when the current speed is below the lower limit value. The operation timing calculation unit 104 may also be configured to judge that the accelerator operation is necessary until the vehicle speed reaches a preset target speed and to judge that the accelerator operation is unnecessary when the vehicle speed reaches the target speed. The target speed may be changed depending on the speed limit of the road, the gradient of the road, the surface resistance of the road, the vehicle weight (loading status of the bed), etc., for example.

In step 426, the operation timing calculation unit 104 calculates the brake operation timing by using the speed change (every T seconds) calculated in the step 422. The operation timing calculation unit 104 in this embodiment judges that the brake operation is necessary when the predicted speed rises quickly or exceeds an upper limit value. Specifically, the operation timing calculation unit 104 estimates that deceleration is necessary (i.e., judges that the brake operation is necessary) when the deviation between the current speed and the predicted speed after the lapse of a predetermined time (e.g., 10 seconds) (change rate of the predicted speed over time) represents acceleration and the speed deviation is a threshold value or more, and when the current speed is above the upper limit value. The operation timing calculation unit 104 may also be configured to judge that the brake operation is necessary until the vehicle speed reaches a preset target speed and to judge that the brake operation is unnecessary when the vehicle speed has reached the target speed. The target speed may be changed depending on the speed limit of the road, the gradient of the road, the surface resistance of the road, the vehicle weight, etc., for example.

In step 428, the overall control unit 112 acquires the calculation result from the operation timing calculation unit 104 and advances to step 430 if the calculation result specifies that the accelerator operation is necessary, or to step 432 if the calculation result specifies that the accelerator operation is unnecessary.

Figure 11:
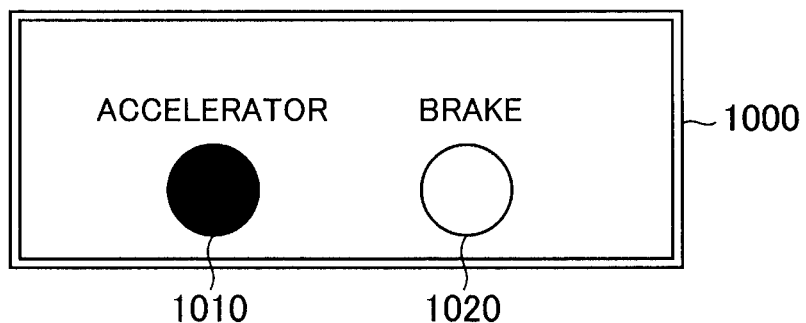
FIG. 11 shows an accelerator operation instruction (screen) displayed on a display device 30 according to the first embodiment of the present invention.
Figure 14:
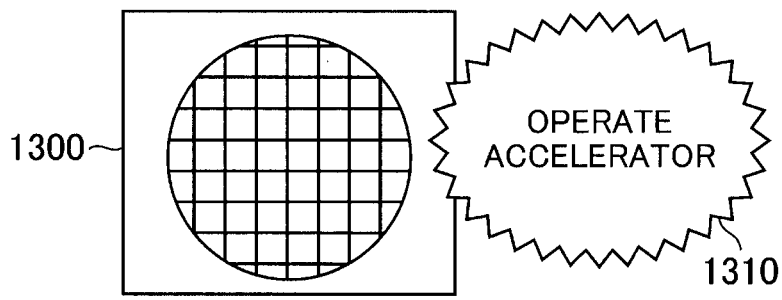
FIG. 14 is a schematic diagram showing the accelerator operation instruction issued via a voice guidance device 1300 according to the first embodiment of the present invention.

In the step 430, the accelerator operation instruction unit 108 gives the accelerator operation instruction to the operator of the mining dump truck via the display device (e.g., monitor) 30 (notification means). FIG. 11 shows the accelerator operation instruction (screen) displayed on the display device 30 according to the first embodiment of the present invention. As shown in FIG. 11, the accelerator operation instruction unit 108 lights up an accelerator lamp 1010 and extinguishes a brake lamp 1020 on the screen 1000 of the display device 30. FIG. 14 is a schematic diagram showing the accelerator operation instruction issued via the voice guidance device (speaker) 1300 according to the first embodiment of the present invention. As shown in FIG. 14, the accelerator operation instruction may also be issued by installing the speaker 1300 as the notification means in place of the display device 30 and outputting a voice 1310 like "OPERATE ACCELERATOR" from the speaker 1300.

In the step 432, the overall control unit 112 acquires the calculation result from the operation timing calculation unit 104 and advances to step 434 if the calculation result specifies that the brake operation is necessary, or to step 436 if the calculation result specifies that the brake operation is unnecessary.

Figure 12:
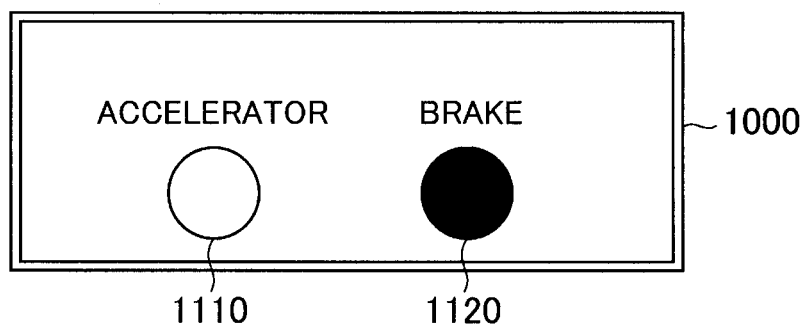
FIG. 12 shows a brake operation instruction (screen) displayed on the display device 30 according to the first embodiment of the present invention.
Figure 15:
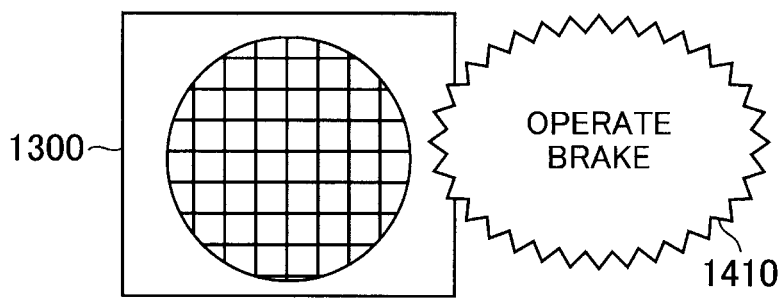
FIG. 15 is a schematic diagram showing the brake operation instruction issued via the voice guidance device 1300 according to the first embodiment of the present invention.

In the step 434, the brake operation instruction unit 110 gives the brake operation instruction to the operator of the mining dump truck via the display device (e.g., monitor) (notification means). FIG. 12 shows the brake operation instruction (screen) displayed on the display device 30 according to the first embodiment of the present invention. As shown in FIG. 12, the brake operation instruction unit 110 lights up a brake lamp 1120 and extinguishes an accelerator lamp 1110 on the screen 1000 of the display device 30. FIG. 15 is a schematic diagram showing the brake operation instruction issued via the voice guidance device (speaker) 1300 according to the first embodiment of the present invention. As shown in FIG. 15, the brake operation instruction may also be issued by installing the speaker 1300 as the notification means in place of the display device 30 and outputting a voice 1410 like "OPERATE BRAKE" from the speaker 1300.

In the step 436, the overall control unit 112 acquires the calculation result from the operation timing calculation unit 104 and judges that the coasting operation instruction is necessary and advances to step 438 if the calculation result specifies that the accelerator operation and the brake operation are both unnecessary. Otherwise, the overall control unit 112 advances to step 440.

Figure 13:
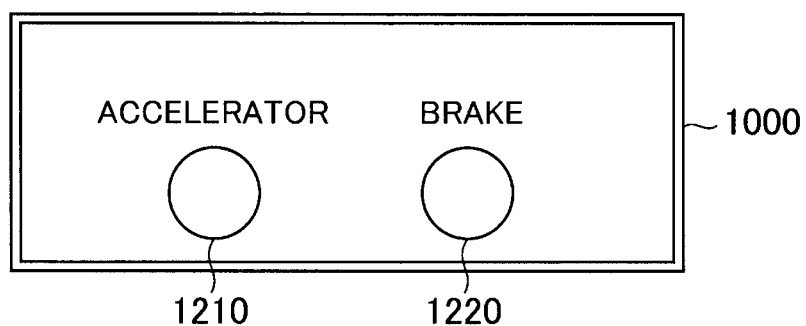
FIG. 13 shows a coasting operation instruction (screen) displayed on the display device 30 according to the first embodiment of the present invention.
Figure 16:
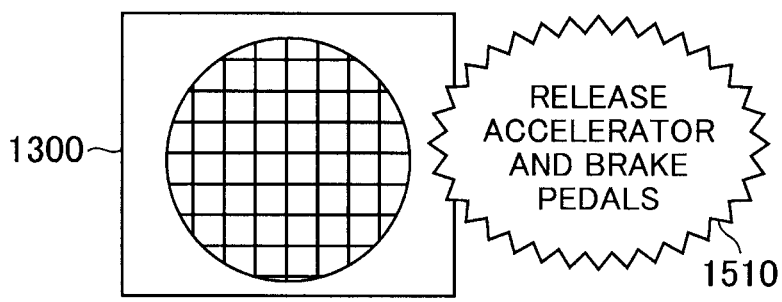
FIG. 16 is a schematic diagram showing the coasting operation instruction issued via the voice guidance device 1300 according to the first embodiment of the present invention.

In the step 438, the coasting operation instruction unit 160 gives the coasting operation instruction to the operator of the mining dump truck via the display device (e.g., monitor) 30 (notification means). FIG. 13 shows the coasting operation instruction (screen) displayed on the display device 30 according to the first embodiment of the present invention. As shown in FIG. 13, the coasting operation instruction unit 160 extinguishes both an accelerator lamp 1210 and a brake lamp 1220 on the screen 1000 of the display device 30. It is also possible to provide a coasting lamp separately on the screen and light up the coasting lamp while extinguishing the accelerator lamp 1210 and the brake lamp 1220. FIG. 16 is a schematic diagram showing the coasting operation instruction issued via the voice guidance device (speaker) 1300 according to the first embodiment of the present invention. As shown in FIG. 16, the coasting operation instruction may also be issued by installing the speaker 1300 as the notification means in place of the display device 30 and outputting a voice 1510 like "RELEASE ACCELERATOR AND BRAKE PEDALS" from the speaker 1300.

In the step 440, the surface resistance estimation unit 166 estimates the surface resistance in the vicinity of the host vehicle position based on the current values of the acceleration and the drive force of the vehicle. Data of the acceleration and the drive force of the vehicle are communicated on an in-vehicle network (e.g., CAN (Control Area Network)) used for in-vehicle communication of sensor information and control information and these data are inputted and used in this embodiment. Since the drive force equals the sum of the product of the surface resistance, the vehicle weight and the gravity acceleration and the product of the vehicle weight and the acceleration, the surface resistance is calculated based on this relationship. After estimating the new surface resistance as above, the surface resistance is compared with the surface resistance (regarding the same place) already stored in the surface resistance storage unit 128. If the two surface resistance values are judged to differ from each other, the old surface resistance stored in the surface resistance storage unit 128 is updated to the new surface resistance. In the updating of the surface resistance, it is desirable to make a judgment on abnormal values of the surface resistance (too large, too small, differing from the tendency up to the present time, etc.) and exclusively use normal values for the updating of the surface resistance.

In step 442, the overall control unit 112 judges whether there is a termination request or not. If there is no termination request, the process returns to the step 402. If there is the termination request, the process advances to step S444. In the step 444, a system termination process is executed. The termination request in the step 442 can be a termination request that is inputted by the operator of the mining dump truck through the operation input unit 144 or a termination request that is properly outputted when the host vehicle reaches the end point of the route of the mining dump truck (e.g., loading site or unloading site of ore or soil), for example.

Conventional fleet operation management systems involve the following problems: First, even though there is a conventional technology for presenting a minimum fuel consumption route (achieving the minimum fuel consumption) to the operator (driver) of the vehicle, the technology does not necessarily achieve the intended fuel-efficient operation depending on the operator's accelerator/brake work (ways of operating the accelerator and brake pedals). Since the accelerator/brake work greatly varies from operator to operator, this factor can deteriorate the fuel efficiency in a greater degree than the benefit of the fuel saving effect achieved by the route selection. There is another conventional technology in which a system monitors the fuel consumption in real time and issues an alarm to the operator when the fuel consumption is significantly high. This technology clarifies that the operator has performed poor accelerator/brake work deteriorating the fuel efficiency; however, the operator cannot learn about concrete accelerator/brake work suitable for reducing the fuel consumption. There is still another technology in which fixed travel route information and surface resistance information are set to the vehicle and the coastable distance is calculated by using the preset information. However, such a technology is hardly capable of dealing with the changes in the surface resistance accompanying the variations in the road surface condition.

In contrast, in the fleet operation management system in accordance with the first embodiment configured as above, the optimum instruction regarding the accelerator pedal operation and the brake pedal operation at the current position from the viewpoint of fuel-efficient operation is given to the mining dump truck's operator based on factors like the changes in the surface resistance and the gradient of the travel route. This prevents the operator from performing wasteful acceleration/deceleration, enabling the reduction in the fuel consumption of the mining dump truck. Further, the issuance of the accelerator pedal depressing instruction and the brake pedal depressing instruction makes it possible to educate the operator concerning how to perform optimum fuel-efficient operation depending on the surface resistance/gradient conditions. As described above, the fuel efficiency of the vehicle can be improved according to this embodiment.

Furthermore, dump trucks such as mining dump trucks do not mainly travel on roads having substantially uniform surface resistance (e.g., paved roads). On the roads where such dump trucks travel, the surface resistance tends to change greatly due to variations in weather (e.g., rain), water sprinkling by sprinkler trucks, temperature change at an oil sand mining site, etc. The fuel efficiency (or fuel consumption) is greatly influenced by the change in the surface resistance. In this embodiment, however, the surface resistance information varying from hour to hour is inputted through the surface resistance input unit 164 and the operation instructions are given to the operator based on the inputted surface resistance. This enables the operator to perform optimum accelerator/brake operations for reducing the vehicle's fuel consumption even in environments in which the surface resistance changes. Moreover, in this embodiment, the surface resistance at the host vehicle's traveling position (current position) is estimated by the surface resistance estimation unit 166 and stored in the surface resistance storage unit 128, and the operation instructions to the operator are issued by using the stored surface resistance. This enables the operator to perform accelerator/brake operations suitable for the latest road surface condition. Especially in the case of mining dump trucks, each vehicle tends to travel through the same travel route a plurality of times and there is an advantage in that it is easy to adapt to the changes in the surface resistance.

While this embodiment has been configured to give the operation instructions to the mining dump truck's operator via the notification means on the assumption that the system is employed for dump trucks in manned operation, the present invention is applicable also to dump trucks capable of traveling autonomously (i.e., dump trucks in unmanned operation). In this case, the process for the issuance of the operation instructions to the operator via the notification means (step 428-438) may be left out, and the travel control of the target vehicle may be carried out by outputting operation signals (acceleration signal, deceleration signal, coasting signal) according to the operation timing calculated in the steps 424 and 426.

Next, a second embodiment of the present invention will be described below. This embodiment is characterized in that fuel-efficient operation guidance information is presented to the operator of the mining dump truck by overlaying fuel-efficient operation support information on the travel route map displayed on the display device 30. The overlaid fuel-efficient operation support information includes acceleration sections in which the vehicle speed increases on the travel route of the mining dump truck, deceleration sections in which the vehicle speed decreases, points at which the brake operation becomes necessary for suppressing excessive acceleration in a section judged to be an acceleration section, points at which the accelerator operation becomes necessary for suppressing excessive deceleration in a section judged to be a deceleration section, etc. Other types of information will be described concretely below.

Figure 17:
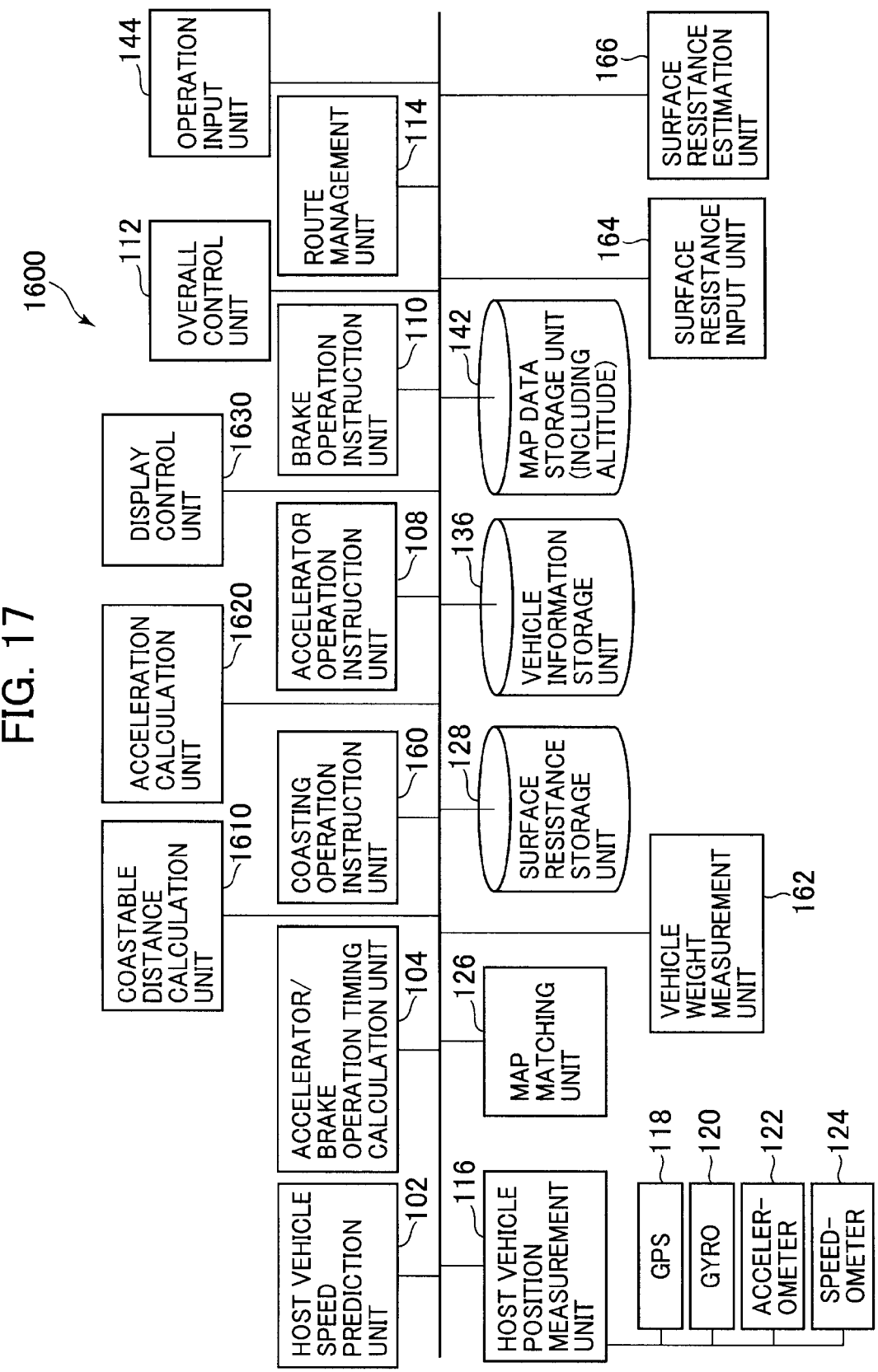
FIG. 17 is a block diagram of a fleet operation management system in accordance with a second embodiment of the present invention.

FIG. 17 is a block diagram of a mining dump truck operation management system according to the second embodiment of the present invention. The in-vehicle terminal system 1600 shown in FIG. 17 corresponds to a configuration obtained by adding a coastable distance calculation unit 1610, an acceleration calculation unit 1620 and a display control unit 1630 to the system 100 in the first embodiment. The arithmetic processing device 10 in this embodiment functions also as the coastable distance calculation unit 1610, the acceleration calculation unit 1620 and the display control unit 1630.

The coastable distance calculation unit 1610 is a component for executing a process of predictively calculating the distance for which the host vehicle can coast from the position where the host vehicle speed change is predicted by the speed prediction unit 102 (coastable distance) based on the predicted speed change.

The acceleration calculation unit 1620 is a component for executing a process of predictively calculating change of the acceleration (time-variation of the speed) based on the speed change predicted by the host vehicle speed prediction unit 102. Based on the acceleration change, the sections in which the vehicle speed increases (acceleration sections) and the sections in which the vehicle speed decreases (deceleration sections) can be discriminated from each other on the travel route.

The display control unit 1630 is a component for executing a control process for having the display device 30 display the coastable distance calculated by the coastable distance calculation unit 1610, the acceleration change calculated by the acceleration calculation unit 1620, and the map information stored in the map data storage unit 142.

Figure 18A:
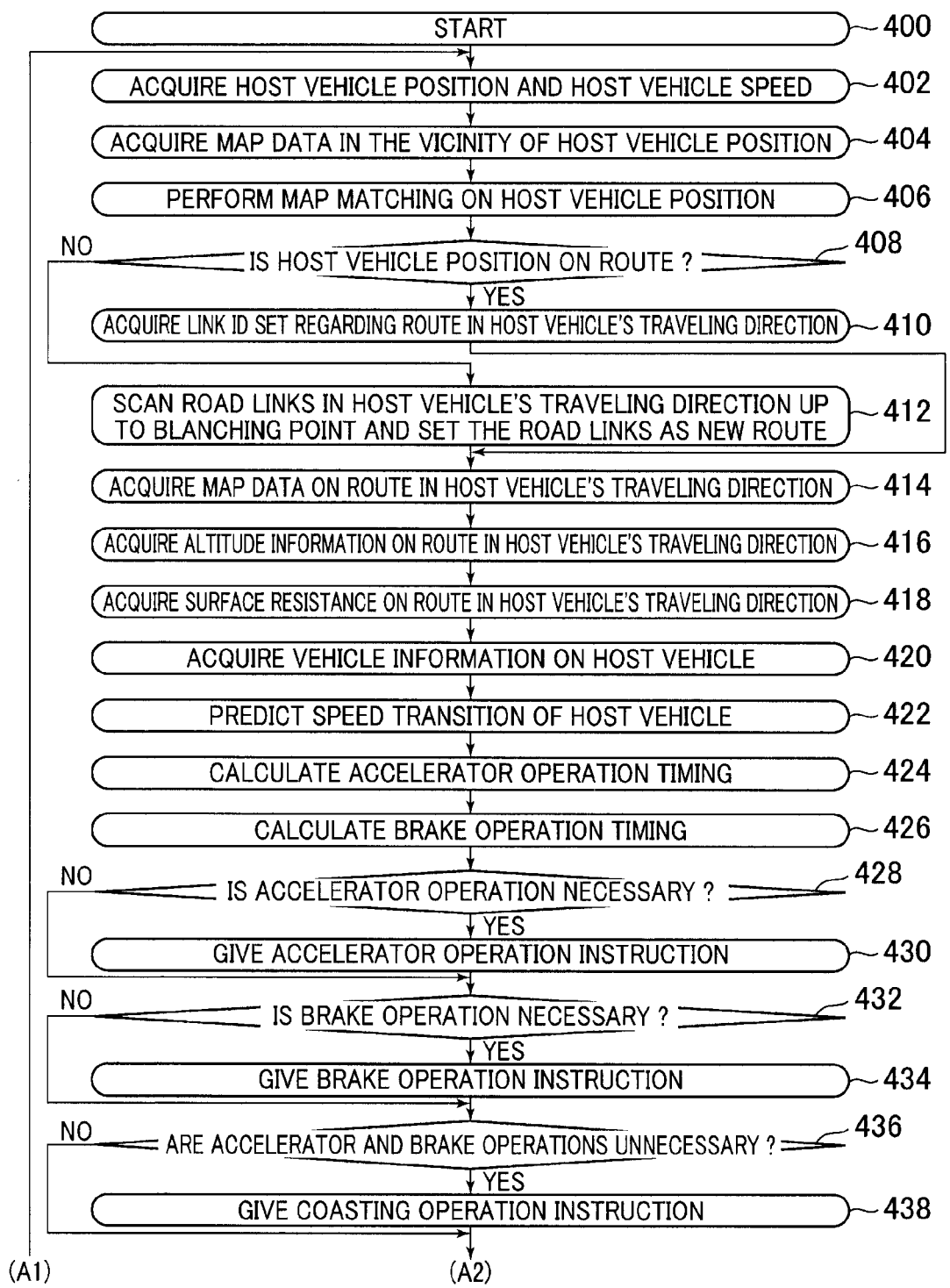
FIG. 18A is a flow chart of a process executed by the fleet operation management system in accordance with the second embodiment of the present invention.
Figure 18B:
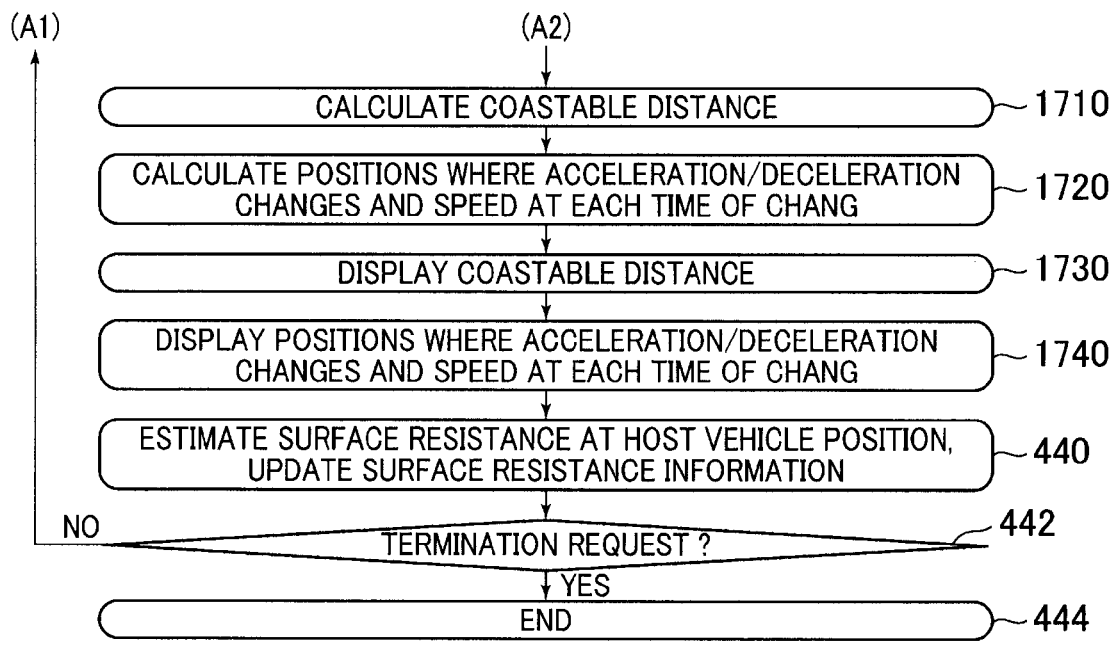
FIG. 18B is a flow chart of the process executed by the fleet operation management system in accordance with the second embodiment of the present invention.

FIGS. 18A and 18B are flow charts of a process executed by the fleet operation management system in accordance with the second embodiment of the present invention. In this flow chart, a coastable distance calculation process and an acceleration calculation process have been added to the flow chart in the first embodiment. The steps 400-438 in FIG. 18A are equivalent to those in the flow chart of FIG. 10 and thus repeated explanation thereof is omitted for brevity. After finishing the step 438, the process advances to step 1710 in FIG. 18B.

In the step 1710, the coastable distance calculation unit 1610 calculates the coastable distance by using the speed change (e.g., speed change at times every T seconds in the time line along the travel route) calculated in the step 422. In this embodiment, the coastable distance is defined as the distance for which the vehicle travels (coasts) until the average speed vi in a section i drops to the speed requiring the accelerator operation. The coastable distance is calculated by obtaining the sum of the product of the speed information in the time series and the sampling time T. In cases where the average speed vi remains higher than the speed requiring the accelerator operation even at the end point of the travel route (destination), the distance to the destination is calculated. In this case, information indicating that the coasting to the end point of the route is possible is displayed on the display device 30 via the display control unit 1630 (see FIGS. 19, 21 and 22 which will be explained later).

In step 1720, the acceleration calculation unit 1620 extracts the sections in which the vehicle speed increases on the travel route (acceleration sections) and the sections in which the vehicle speed decreases on the travel route (deceleration sections) by using the speed change calculated in the step 422. Further, the acceleration calculation unit 1620 also extracts points at which the predicted speed switches from acceleration to deceleration (i.e., boundaries between an acceleration section and a deceleration section), the vehicle speed at each of the points, points at which the vehicle speed switches from deceleration to acceleration, and speed at each of the points. In the acceleration sections, there is a possibility that the vehicle speed increases over the speed limit due to the acceleration in the coasting on a descending slope (excessive acceleration). In the deceleration sections, there is a possibility of excessive deceleration due to the deceleration in the coasting on an ascending slope. Therefore, the acceleration calculation unit 1620 in this embodiment also extracts points at which the excessive acceleration or excessive deceleration occurs (e.g., points at which the predicted speed reaches a preset speed) and the vehicle speed at each of the points of excessive acceleration/deceleration. The points of excessive acceleration, the points of excessive deceleration, and the vehicle speed at each of the points extracted in this step are displayed on the display device 30 via the display control unit 1630 (see FIGS. 19-21 for details).

In step 1730, the display control unit 1630 displays the coastable distance calculated by the coastable distance calculation unit 1610 on the display device 30. In step 1740, the display control unit 1630 displays the acceleration sections, the deceleration sections, etc. calculated by the acceleration calculation unit 1620 on the display device 30. Details of the display screens in these cases will be explained later referring to FIGS. 19-23.

After finishing the step 1740, the process advances to the step 440. The steps 440-444 are equivalent to those in the flow chart of FIG. 10 and thus repeated explanation thereof is omitted for brevity.

The screens displayed on the display device 30 by the steps 1730 and 1740 will be explained here by referring to FIGS. 19-21. Incidentally, the display screens (notification) regarding the accelerator pedal operation instruction and the brake pedal operation instruction displayed in the steps 430, 434 and 436 are equivalent to those in the first embodiment and thus repeated explanation thereof is omitted for brevity.

Figure 19:
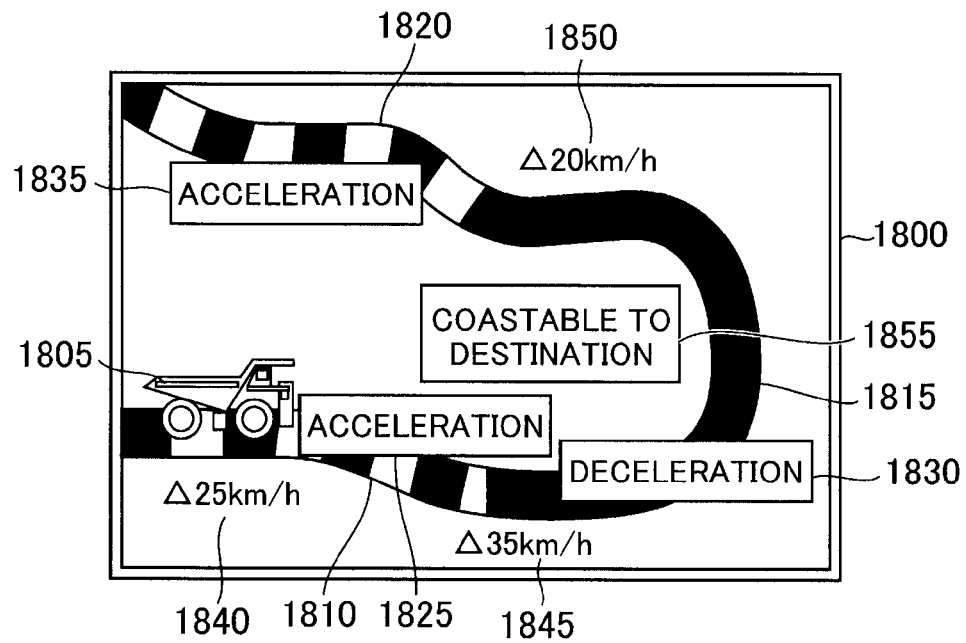
FIG. 19 is a schematic diagram showing an example of a screen in which coastable distance, etc. are overlaid on a travel route displayed on the display device 30.

FIG. 19 is a schematic diagram showing an example of a screen in which the coastable distance, the vehicle's acceleration sections and deceleration section, the predicted speeds at the boundaries between acceleration/deceleration sections, and the host vehicle position are overlaid on the travel route (map) displayed on the display device 30. The example of FIG. 19 shows a case where the coasting is possible to the destination and both acceleration and deceleration sections exist between the current position and the destination.

Displayed on the screen 1800 in FIG. 19 are a host vehicle position mark 1805 indicating the current position of the host vehicle, a first acceleration section 1810, a first deceleration section 1815, and a second acceleration section 1820. As is obvious from the illustration, the acceleration sections in the travel route are indicated by "vertical stripes" and the deceleration sections in the travel route are indicated by "filling with black" in the examples of FIGS. 19-21. The discrimination between acceleration sections and deceleration sections may also be made by attaching a text 1825 "ACCELERATION" to the first acceleration section 1810, a text 1830 "DECELERATION" to the first deceleration section 1815, and a text 1835 "ACCELERATION" to the second acceleration section 1820, for example.

On the screen 1800, at the boundary from the first acceleration section 1810 to the first deceleration section 1815, a text 1845 "35 km/h" representing the predicted speed at the point is displayed. At the boundary from the first deceleration section 1815 to the second acceleration section 1820, a text 1850 "20 km/h" representing the predicted speed at the point is displayed.

The screen 1800 further displays the host vehicle position 1805 representing the current position of the host vehicle on the travel route. The screen 1800 is further provided with a display part for indicating the coastable distance. In the display part, a text 1855 "COASTABLE TO DESTINATION", indicating that the coasting to the destination (end point of the travel route) is possible, is displayed.

Figure 20:
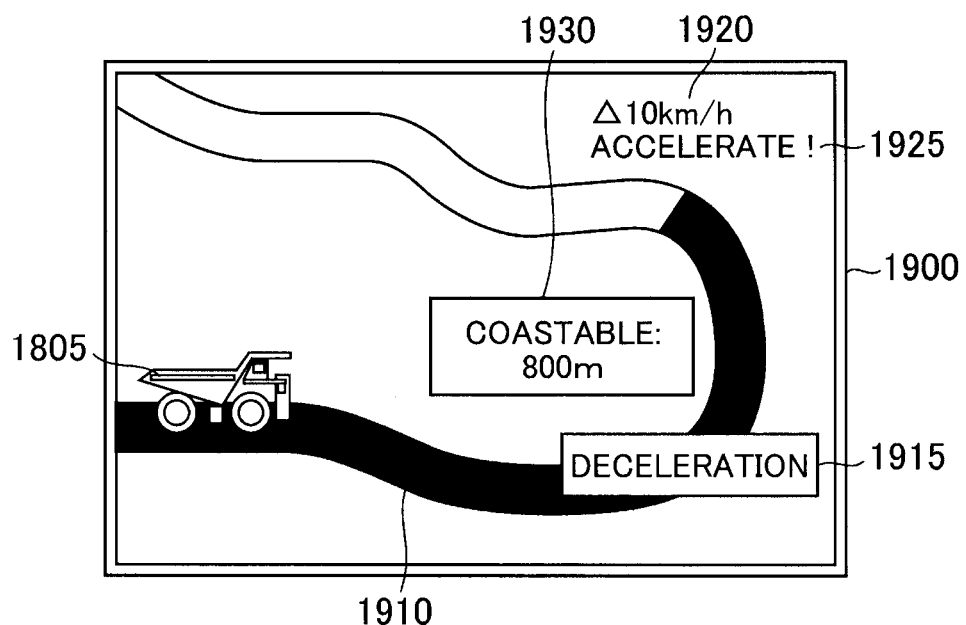
FIG. 20 is a schematic diagram showing another example of a screen in which the coastable distance, etc. are overlaid on a travel route displayed on the display device 30.

FIG. 20 is a schematic diagram showing an example of a screen in which the coastable distance, the vehicle's deceleration section, a point at which the depressing of the accelerator pedal is necessary, the predicted speed at the point, and the host vehicle position are overlaid on the travel route (map) displayed on the display device 30. The example of FIG. 20 shows a case where the coasting is possible to the destination and both acceleration and deceleration sections exist between the current position and the destination. The example of FIG. 20 shows a case where the coasting is possible to a point 800 m away from the current position, the accelerator operation is necessary at the 800 m point, and the predicted speed at the point is 10 km/h.

Displayed on the screen 1900 in FIG. 20 are the host vehicle position mark 1805 indicating the current position of the host vehicle and a first deceleration section 1910. Also for the first deceleration section 1910, a text 1915 "DECELERATION" may be displayed similarly to the above example. Similarly to the screen 1800, the screen 1900 displays the host vehicle position 1805 representing the current position of the host vehicle on the route.

The screen 1900 also displays a text 1920 "10 km/h" representing the predicted speed at the point where the accelerator pedal depressing operation is necessary and a text 1925 "ACCELERATE !" indicating that the accelerator pedal depressing operation is necessary at the point. Further, the screen 1900 displays a text 1930 "COASTABLE: 800 m" indicating that the host vehicle can coast to a point 800 m away from the current position.

Figure 21:
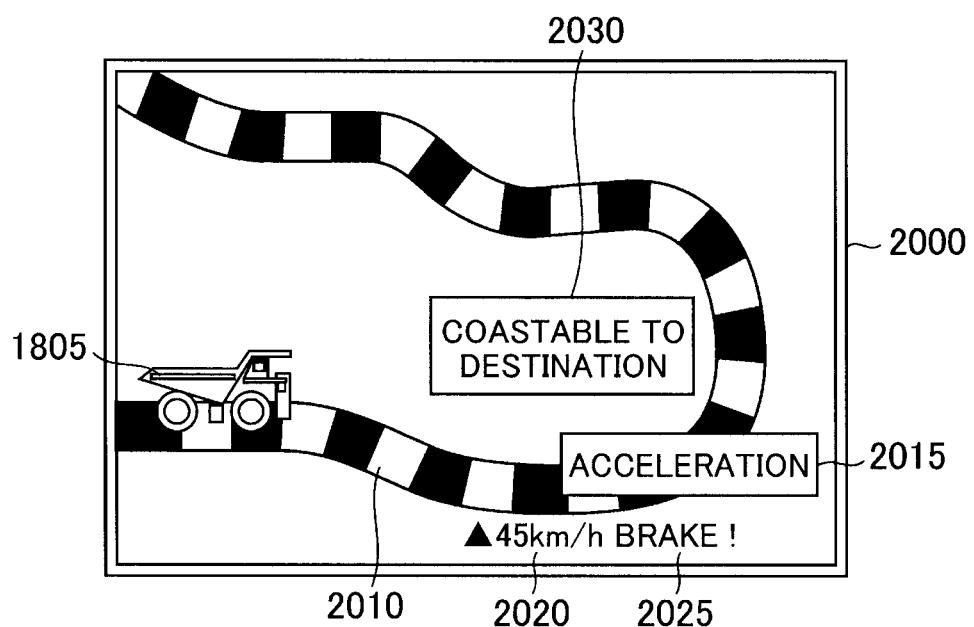
FIG. 21 is a schematic diagram showing another example of a screen in which the coastable distance, etc. are overlaid on a travel route displayed on the display device 30.

FIG. 21 is a schematic diagram showing an example of a screen in which the coastable distance, the vehicle's acceleration section, a point at which the depressing of the brake pedal is necessary, the predicted speed at the point, and the host vehicle position are overlaid on the travel route (map) displayed on the display device 30. The example of FIG. 21 shows a case where the coasting is possible from the current position to the destination and there exists a point where the vehicle speed reaches a preset speed at which the braking might not work in the middle of the acceleration section (i.e., point at which the brake pedal depressing operation is necessary).

Displayed on the screen 2000 in FIG. 21 are the host vehicle position mark 1805 indicating the current position of the host vehicle and a first acceleration section 2010. Also for the first acceleration section 2010, a text 2015 "ACCELERATION" may be displayed similarly to the above example. Similarly to the screen 1800, the screen 2000 displays the host vehicle position 1805 representing the current position of the host vehicle on the route.

The screen 2000 also displays a text 2020 "45 km/h" representing the predicted speed at the point where the brake pedal depressing operation is necessary and a text 2025 "BRAKE !" indicating that the brake pedal depressing operation is necessary at the point. Further, the screen 2000 displays a text 2030 "COASTABLE TO DESTINATION" indicating that the host vehicle can coast from the current position to the destination.

Next, another form of the screen displayed on the display device 30 by the steps 1730 and 1740 will be explained below referring to FIGS. 22 and 23. Also in this explanation, repeated explanation of the display screens (notification) regarding the accelerator pedal operation instruction and the brake pedal operation instruction displayed in the steps 430, 434 and 436 is omitted.

Figure 22:
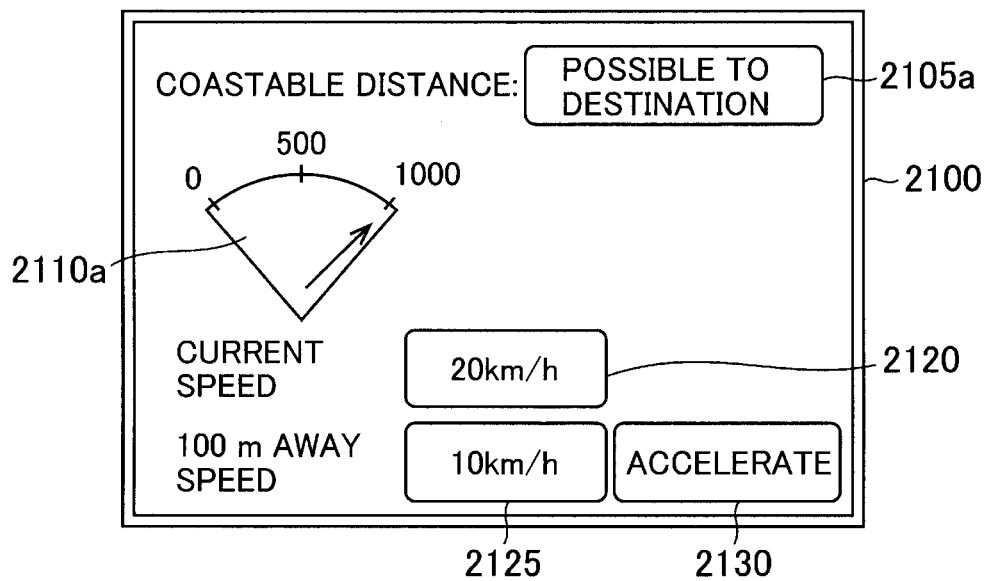
FIG. 22 is a schematic diagram showing an example of a screen of the display device 30 displaying the coastable distance, etc. in the form of text/graphic display.
Figure 23:
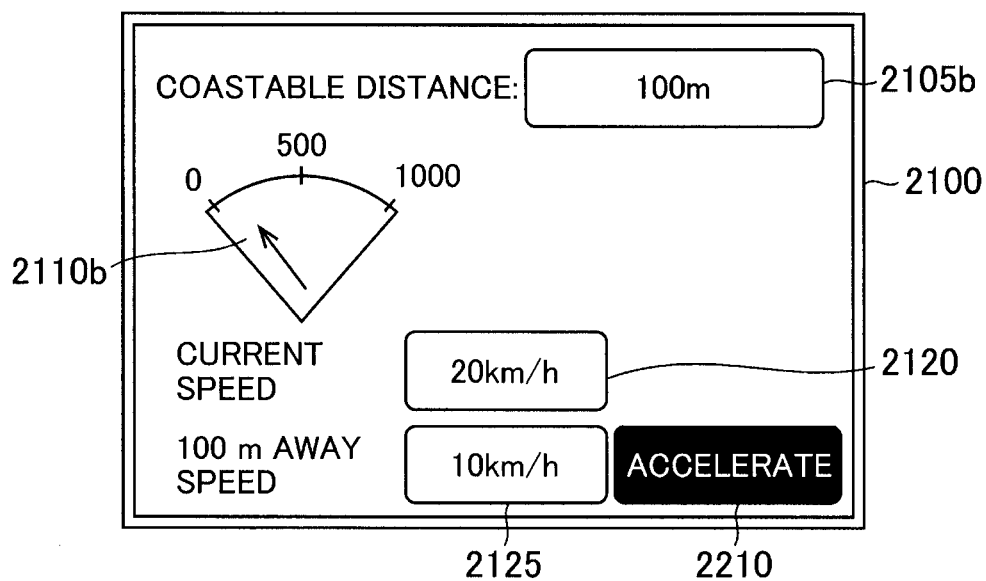
FIG. 23 is a schematic diagram showing another example of a screen of the display device 30 displaying the coastable distance, etc. in the form of text/graphic display.

FIGS. 22 and 23 are schematic diagrams showing an example of a screen displaying the coastable distance, the current speed, the predicted speed at a point 100 m away, and an operation instruction regarding an operation necessary at the point (instruction for the accelerator pedal depressing operation or the brake pedal depressing operation) in the form of text/graphic display. The example of FIGS. 22 and 23 shows a case where the coasting is possible to the destination, the current speed is 20 km/h, the predicted speed at the point 100 m away from the current position is 10 km/h, and the accelerator operation is necessary at the point.

Displayed on the screen 2100 in FIG. 22 are a text 2105a "POSSIBLE TO DESTINATION" (as the coastable distance) indicating that the coasting is possible from the current position to the destination, a meter graphic 2110a indicating the same thing as the text 2105a, a text 2120 "20 km/h" indicating the current speed, and a text 2125 "10 km/h" indicating the predicted speed at the point 100 m away.

The screen 2100 is also provided with a display part 2130 for indicating that the accelerator pedal operation becomes necessary at a point 100 m away. A text "ACCELERATE !" is displayed in the display part 2130. The text is highlighted (2210) as shown in FIG. 23 when the vehicle reaches a point where the accelerator operation is expected to become necessary at a point 100 m away. The screen 2100 in FIG. 23 also displays a text 2105b "100 m" indicating that the coasting is possible to a point 100 m away from the current position and a meter graphic 2110b indicating the same thing as the text 2105b.

Incidentally, the accelerator pedal operation instruction may also be issued by outputting a voice (e.g., "OPERATE ACCELERATOR") through the voice guidance device 1300 instead of outputting the instruction through the display part 2130. While only the accelerator pedal operation instruction is issued in this example, it goes without saying that the brake pedal operation instruction may also be issued through a similar display part or through the voice guidance device 1300.

In the fleet operation management system in accordance with the second embodiment configured as above, the fuel-efficient operation support information is displayed on the screen of the display device 30. This allows the operator of the mining dump truck to intuitively understand the information. Further, since the points requiring the accelerator/brake operations in the future are displayed previously, the operator is allowed to perform the accelerator/brake operations without urgency and in a relaxed manner.

Next, a third embodiment of the present invention will be described below. This embodiment is mainly characterized in that the functions of the mining dump truck operation management system explained in the above embodiments are divided and installed in a plurality of mining dump trucks and a station (vehicle management system center) for managing the mining dump trucks. For example, in this embodiment, the accelerator/brake operation timing calculation unit 104 and the storage means (e.g., the map data storage unit 142 and the surface resistance storage unit 128) are installed in a terminal on the vehicle management system center's side.

According to this embodiment, the configuration of the in-vehicle terminal system can be simplified compared to that in the first embodiment, and the total system cost can be reduced in cases where the number of mining dump trucks to be managed is large (i.e., when the number of in-vehicle terminal systems is large). Further, since the necessary types of information (map information, altitude information, surface resistance, etc.) are managed centrally by the vehicle management system center, the instructions regarding the accelerator operation timing, the brake operation timing, etc. can be issued by constantly using the latest information even when the actual road conditions have changed. Furthermore, by the integration of the information (e.g., surface resistance) uploaded from the vehicles into the vehicle management system center, the latest information can be shared by the vehicles at their respective sites, by which further fuel saving can be achieved for the vehicles at their respective sites.

Figure 24:
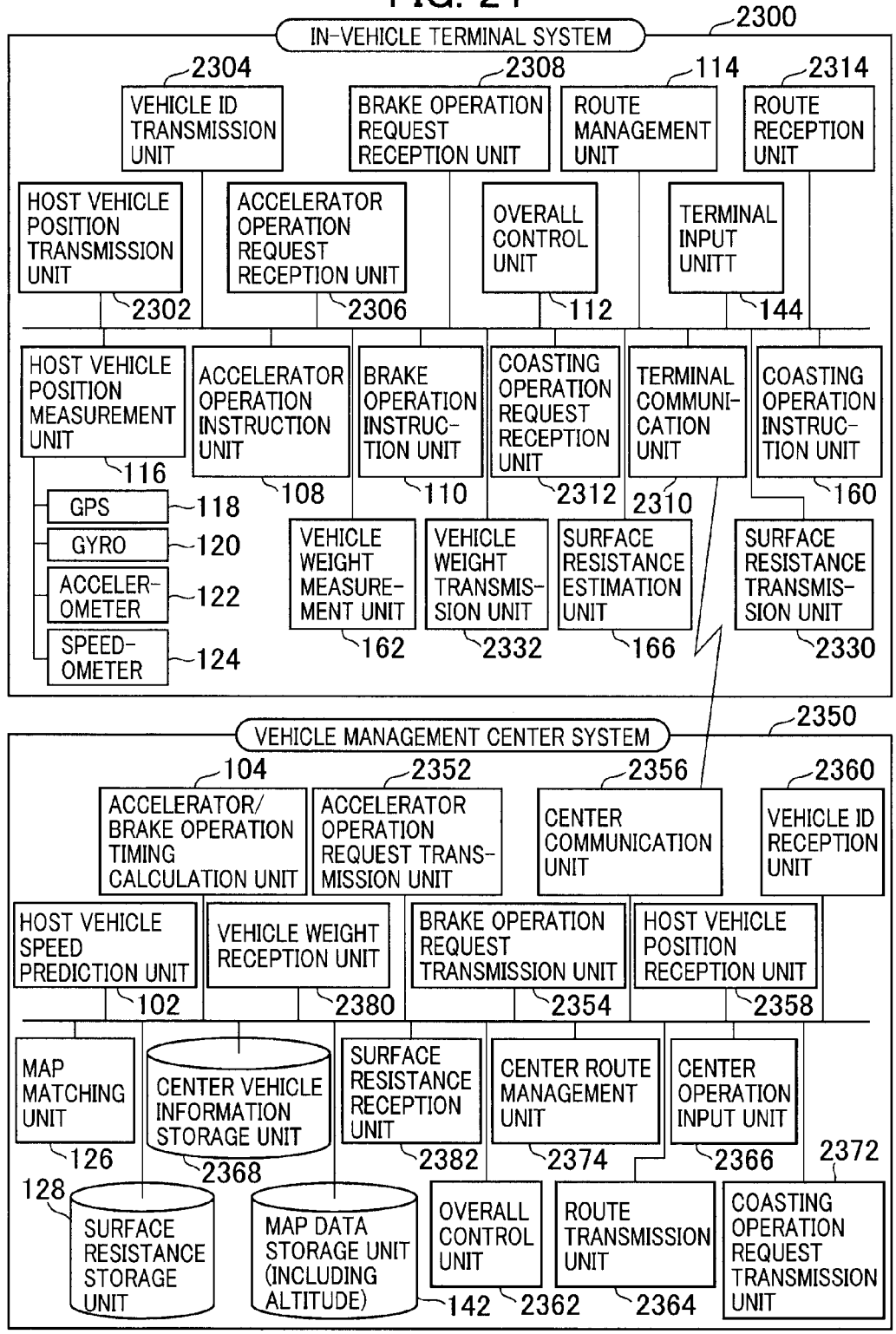
FIG. 24 is a block diagram of a fleet operation management system in accordance with a third embodiment of the present invention.

FIG. 24 is a block diagram of a mining dump truck operation management system according to the third embodiment of the present invention. The system shown in FIG. 24 is made up of an in-vehicle terminal system 2300 installed in each mining dump truck and a vehicle management center system 2350 installed in the terminal of the vehicle management system center. Each of the systems 2300 and 2350 has a hardware configuration similar to that shown in FIG. 3.

Referring to FIG. 24, the in-vehicle terminal system 2300 includes the overall control unit 112, the route management unit 114, the operation input unit 144, the host vehicle position measurement unit 116 (including the GPS receiver 118, the gyro sensor 120, the accelerometer 122 and the speedometer 124), the accelerator operation instruction unit 108, the brake operation instruction unit 110, the coasting operation instruction unit 160, the surface resistance estimation unit 166 and the vehicle weight measurement unit 162 as a configuration equivalent to that in the in-vehicle terminal system 100 in the first embodiment.

The in-vehicle terminal system 2300 in this embodiment further includes a terminal communication unit 2310, a host vehicle position transmission unit 2302, a vehicle ID transmission unit 2304, an accelerator operation request reception unit 2306, a brake operation request reception unit 2308, a route reception unit 2314, a vehicle weight transmission unit 2332, and a surface resistance transmission unit 2330 as communication means for transmitting and receiving data to/from the vehicle management center system 2350.

The terminal communication unit 2310 is a component for executing wireless communication with the vehicle management center system 2350. Various types of information communicated with the vehicle management center system 2350 are inputted and outputted via the terminal communication unit 2310.

The host vehicle position transmission unit 2302 is a component for executing a process for transmitting the host vehicle position and the host vehicle speed information obtained by the host vehicle position measurement unit 116 to the vehicle management center system 2350 via the terminal communication unit 2310. The vehicle ID transmission unit 2304 is a component for transmitting identification information (vehicle ID), which has been assigned uniquely to each of the mining dump trucks as the objects of management by the vehicle management center, to the vehicle management center system 2350 via the terminal communication unit 2310. The surface resistance transmission unit 2330 is a component for transmitting the surface resistance acquired via the surface resistance estimation unit 166, etc. to the vehicle management center system 2350 via the terminal communication unit 2310. The vehicle weight transmission unit 2332 is a component for transmitting the vehicle weight measured by the vehicle weight measurement unit 162 to the vehicle management center system 2350 via the terminal communication unit 2310.

The accelerator operation request reception unit 2306 is a component for receiving an accelerator operation request transmitted from the vehicle management center system 2350 via the terminal communication unit 2310. The brake operation request reception unit 2308 is a component for receiving a brake operation request transmitted from the vehicle management center system 2350 via the terminal communication unit 2310. A coasting operation request reception unit 2312 is a component for receiving a coasting operation request transmitted from the vehicle management center system 2350 via the terminal communication unit 2310. The route reception unit 2314 is a component for receiving a route transmitted from the vehicle management center system 2350 via the terminal communication unit 2310.

In FIG. 24, the vehicle management center system 2350 includes the host vehicle speed prediction unit 102, the accelerator/brake operation timing calculation unit 104, the map matching unit 126, the surface resistance storage unit 128 and the map data storage unit 142 as a configuration equivalent to that in the in-vehicle terminal system 100 in the first embodiment.

The vehicle management center system 2350 further includes a center vehicle information storage unit 2368 for storing vehicle information (frontal projected area, Cd value regarding air resistance, vehicle weight, etc.) on the mining dump trucks as the management objects, a center route management unit 2374 for executing a process of managing the travel routes of the mining dump trucks as the management objects in regard to each vehicle ID, a center operation input unit 2366 for inputting operations by a manager in the vehicle management center (e.g., termination request), and an overall control unit 2362 for executing the overall control of the vehicle management center system 2350. Incidentally, the center vehicle information storage unit 2368 is included in the storage device, the center operation input unit 2366 is included in the input device, and the center route management unit 2374 and the overall control unit 2362 are included in the functions of the arithmetic processing device.

The vehicle management center system 2350 in this embodiment further includes a center communication unit 2356, an accelerator operation request transmission unit 2352, a brake operation request transmission unit 2354, a coasting operation request transmission unit 2372, a route transmission unit 2364, a host vehicle position reception unit 2358, a vehicle ID reception unit 2360, a vehicle weight reception unit 2380 and a surface resistance reception unit 2382 as means for transmitting and receiving data to/from the in-vehicle terminal systems 2300.

The accelerator operation request transmission unit 2352 is a component for transmitting the accelerator operation request calculated by the accelerator/brake operation timing calculation unit 104 to the in-vehicle terminal system 2300 via the center communication unit 2356. The brake operation request transmission unit 2354 is a component for transmitting the brake operation request calculated by the accelerator/brake operation timing calculation unit 104 to the in-vehicle terminal system 2300 via the center communication unit 2356. The coasting operation request transmission unit 2372 is a component for transmitting the coasting operation request according to the result of the calculation by the accelerator/brake operation timing calculation unit 104 to the in-vehicle terminal system 2300 via the center communication unit 2356. The route transmission unit 2364 is a component for transmitting the route managed by the center route management unit 2374 to the in-vehicle terminal system 2300 via the center communication unit 2356.

The host vehicle position reception unit 2358 is a component for receiving the host vehicle position and the host vehicle speed transmitted from the in-vehicle terminal system 2300 via the center communication unit 2356. The vehicle ID reception unit 2360 is a component for receiving the vehicle ID transmitted from the in-vehicle terminal system 2300 via the center communication unit 2356. The vehicle weight reception unit 2380 is a component for receiving the vehicle weight transmitted from the in-vehicle terminal system 2300 via the center communication unit 2356. The surface resistance reception unit 2382 is a component for receiving the surface resistance transmitted from the in-vehicle terminal system 2300 via the center communication unit 2356.

Figure 25:
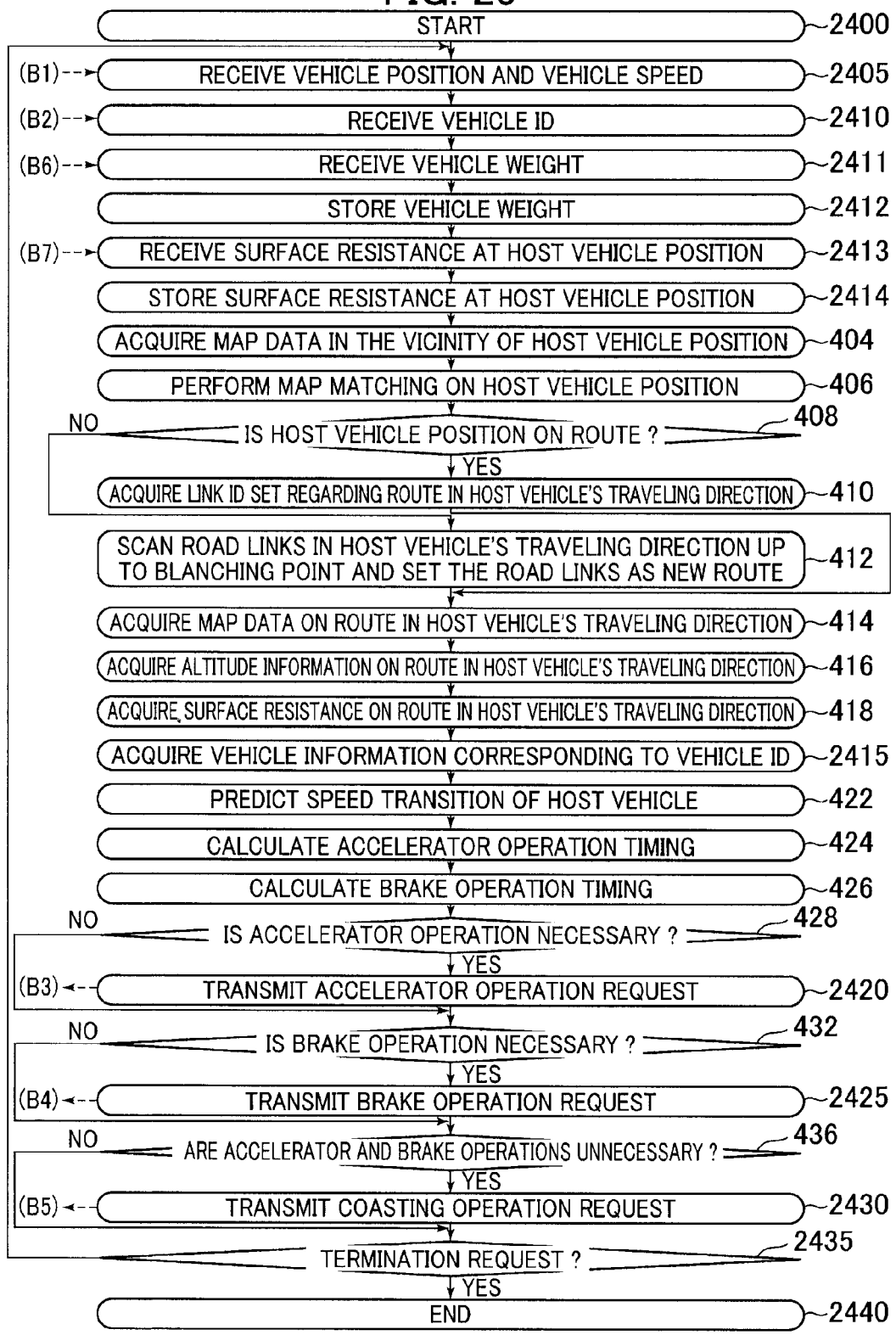
FIG. 25 is a flow chart of a process executed by a vehicle management center system 2350 in the fleet operation management system in accordance with the third embodiment of the present invention.
Figure 26:
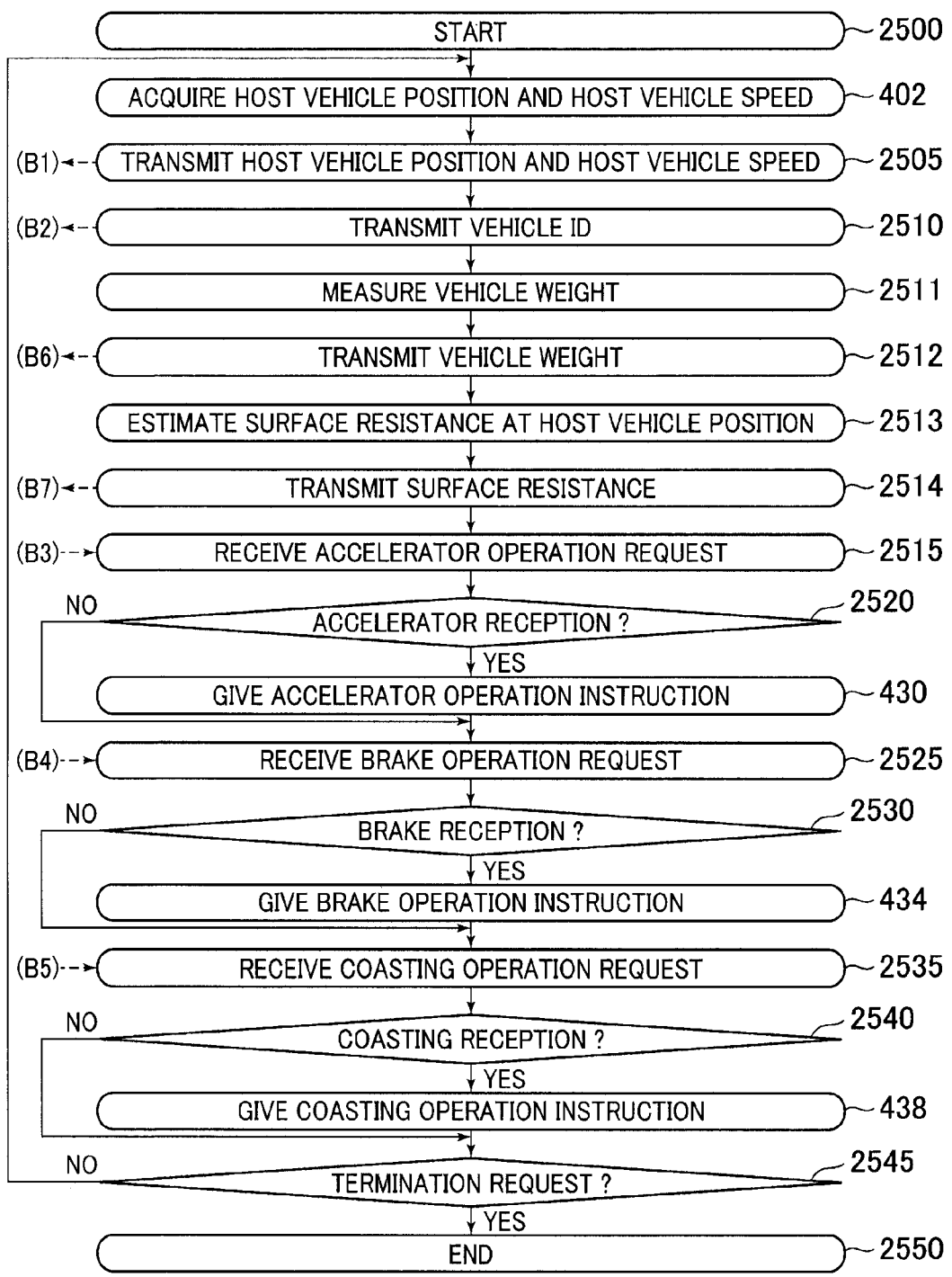
FIG. 26 is a flow chart of a process executed by one of in-vehicle terminal systems 2300 installed in mining dump trucks in the fleet operation management system in accordance with the third embodiment of the present invention.

FIG. 25 is a flow chart of a process executed by the vehicle management center system 2350 (management station) in the fleet operation management system in accordance with the third embodiment of the present invention. FIG. 26 is a flow chart of a process executed by one of the in-vehicle terminal systems 2300 installed in the mining dump trucks in the fleet operation management system in accordance with the third embodiment of the present invention. Steps in the flow charts equivalent to those in FIG. 10 are assigned the already-used reference characters (step numbers) and repeated explanation thereof can be omitted in the following description.

The vehicle management center system 2350 in this embodiment is configured to execute the accelerator operation timing calculation process and the brake operation timing calculation process in the flow chart in the first embodiment and supply the result of the processes to the in-vehicle terminal system 2300. Meanwhile, the in-vehicle terminal system 2300 executes the host vehicle position acquisition process in the first embodiment and the issuance of the instructions to the operator of the mining dump truck. The instructions to the operator are issued according to the accelerator operation request, the brake operation request and the coasting operation request from the vehicle management center 2350.

Next, the contents of the processes in the flow charts of FIGS. 25 and 26 will be explained below. In the first step 2400 in FIG. 25, the vehicle management center system 2350 executes an initial setting process such as the setting of the information regarding the travel route of a mining dump truck. It is assumed here that the setting of the travel route information is made according to inputs by a manager in the vehicle management center through the center operation input unit 2366, and the inputted travel route is managed in the center route management unit 2374.

Meanwhile, in the in-vehicle terminal system 2300, an initial setting process (e.g., the setting of the route information on the travel route for the mining dump truck) is executed in step 2500 and the process advances to the step 402. The setting of the route information in this step may either be made by the operator's input through the operation input unit 144 or by use of a route that is managed by the center route management unit 2374 of the vehicle management center system 2350, transmitted from the route transmission unit 2364 and received by the route reception unit 2314 (e.g., the route inputted in the step 2400). In the step 402, the host vehicle position and the host vehicle speed are acquired similarly to the first embodiment and the process advances to step 2505.

In the step 2505, the host vehicle position and the host vehicle speed acquired in the step 402 are transmitted from the host vehicle position transmission unit 2302 to the vehicle management center system 2350 via the terminal communication unit 2310 (B1).

In step 2510, the vehicle ID uniquely assigned to the vehicle for identification is transmitted from the vehicle ID transmission unit 2304 to the vehicle management center system 2350 via the terminal communication unit 2310 (B2).

In step 2511, the vehicle weight is measured by the vehicle weight measurement unit 162 similarly to the first embodiment. The measured vehicle weight is transmitted from the vehicle weight transmission unit 2332 to the vehicle management center system 2350 via the terminal communication unit 2310 (B6) (step 2512).

In the next step 2513, the surface resistance estimation unit 166 estimates the surface resistance in the vicinity of the current position based on the acceleration and the drive force of the vehicle. Data of the acceleration and the drive force of the vehicle are communicated on the in-vehicle network (e.g., CAN (Control Area Network)) used for in-vehicle communication of sensor information, control information, etc., and thus these data can be used in this step. The surface resistance is calculated based on the relationship that the drive force equals the sum of the product of the surface resistance, the vehicle weight and the gravity acceleration and the product of the vehicle weight and the acceleration.

In the next step 2514, the surface resistance estimated in the step 2513 is transmitted from the surface resistance transmission unit 2330 to the vehicle management center system 2350 via the terminal communication unit 2310 (B7).

Returning to FIG. 25 (the process in the vehicle management center system 2350), in step 2405, the information on the host vehicle position and the host vehicle speed transmitted from the in-vehicle terminal system 2300 in the step 2505 is received by the host vehicle position reception unit 2358 of the vehicle management center system 2350 via the center communication unit 2356 (B1). In step 2410, the vehicle ID transmitted from the in-vehicle terminal system 2300 in the step 2510 is received by the vehicle ID reception unit 2360 via the center communication unit 2356 (B2).

In step 2411, the vehicle weight transmitted from the in-vehicle terminal system 2300 in the step 2511 is received by the vehicle weight reception unit 2380 via the center communication unit 2356 (B6). The received vehicle weight is stored in the center vehicle information storage unit 2368 (step 2412). In the storing in the center vehicle information storage unit 2368, the vehicle weight is stored as vehicle weight corresponding to the vehicle ID received in the step 2410.

In step 2413, the surface resistance in the vicinity of the host vehicle position received in the step 2405 is received by the surface resistance reception unit 2382 via the center communication unit 2356 (B7). The surface resistance in the vicinity of the host vehicle position is stored in the surface resistance storage unit 128 (step 2414). In the storing in the surface resistance storage unit 128, the surface resistance is stored while being associated with the ID (link ID) of the road link closest to the host vehicle position received in the step 2405. The judgment on which road link is the closest to the host vehicle position received in the step 2405 is made by the map matching unit 126 by performing the matching between the host vehicle position and road links. Incidentally, if the surface resistance storage unit 128 has already stored surface resistance associated with the same ID as that of the road link corresponding to the surface resistance received in the step 2413, the two surface resistance values are compared with each other. If the two surface resistance values are judged to differ from each other, the surface resistance stored in the surface resistance storage unit 128 is updated to the surface resistance received in the step 2413. In the updating of the surface resistance, it is desirable to make the judgment on abnormal values of the surface resistance and exclusively use normal values for the updating of the surface resistance.

The steps 404-418 in FIG. 25 are equivalent those in the first embodiment and thus repeated explanation thereof is omitted for brevity. In the next step 2415, vehicle information (vehicle weight, frontal projected area, Cd value regarding air resistance, etc.) corresponding to the vehicle ID received in the step 2410 is acquired from a vehicle ID-specific vehicle information table 2600 (see FIG. 27 which will be explained later) stored in the center vehicle information storage unit 2368.

Figure 27:
FIG. 27 is a schematic diagram showing a vehicle ID-specific vehicle information table 2600 stored in a center vehicle information storage unit 2368.

FIG. 27 is a schematic diagram showing the vehicle ID-specific vehicle information table 2600 stored in the center vehicle information storage unit 2368 in the third embodiment of the present invention. The vehicle ID-specific vehicle information table 2600 shown in FIG. 27 is a table for managing the vehicle information (stored in the vehicle information table 900 in the first embodiment) in regard to each vehicle ID. In this table, the vehicle ID 2610 for the identification of the vehicle is assigned to each piece of information. By storing the vehicle information in regard to each vehicle ID as above, instructions suitable for each mining dump truck can be issued even in management of a plurality of mining dump trucks differing in specifications, conditions, travel route, etc.

The steps 422-428 after the step 2415 are equivalent to those in the first embodiment and thus repeated explanation thereof is omitted for brevity. When the accelerator pedal depressing operation (accelerator operation) is judged to be necessary in the step 428, the accelerator operation request transmission unit 2352 transmits the accelerator operation request to the in-vehicle terminal system 2300 via the center communication unit 2356 together with the vehicle ID received in the step 2410 (B3) (step 2420).

The step 432 for judging whether the brake pedal depressing operation is necessary or not is equivalent to that in the first embodiment. When the brake pedal depressing operation (brake operation) is judged to be necessary in the step 432, the brake operation request transmission unit 2354 transmits the brake operation request to the in-vehicle terminal system 2300 via the center communication unit 2356 together with the vehicle ID received in the step 2410 (B4) (step 2425).

The step 436 for judging whether the accelerator/brake pedal releasing operation is necessary or not is equivalent to that in the first embodiment. When the accelerator operation and the brake operation are judged to be both unnecessary (i.e., the coasting operation is judged to be necessary) in the step 436, the coasting operation request transmission unit 2372 transmits the coasting operation request to the in-vehicle terminal system 2300 via the center communication unit 2356 together with the vehicle ID received in the step 2410 (B5) (step 2430).

In step 2435, the overall control unit 2362 judges whether there is a termination request or not. If there is no termination request, the process returns to the step 2405. If there is the termination request, the process advances to step S2440. The termination request in the step 2435 can be a termination request by a manager in the vehicle management center through the center operation input unit 2366, for example. In the step 2440, a system termination process is executed.

Returning FIG. 26 (the process in the in-vehicle terminal system 2300), in step 2515, if the accelerator operation request with the vehicle ID of the host vehicle has been transmitted from the vehicle management center system 2350, the accelerator operation request reception unit 2306 of the in-vehicle terminal system 2300 receives the accelerator operation request via the terminal communication unit 2310 (B3). In step 2520, the overall control unit 112 judges whether the accelerator operation request has been received in the step 2515 or not. If "Yes" (received), the process advances to the step 430. If "No" (not received), the process advances to step 2525.

The step 430 is equivalent to that in the first embodiment. Specifically, as the accelerator operation instruction to the operator of the mining dump truck, the accelerator lamp 1010 is lit up while extinguishing the brake lamp 1020 on the screen 1000 of the display device 30 as shown in FIG. 11. It is also possible to output the voice 1310 "OPERATE ACCELERATOR" from the speaker 1300 as shown in FIG. 14.

In step 2525, if the brake operation request with the vehicle ID of the host vehicle has been transmitted from the vehicle management center system 2350, the brake operation request reception unit 2308 receives the brake operation request via the terminal communication unit 2310 (B4). In step 2530, the overall control unit 112 judges whether the brake operation request has been received in the step 2525 or not. If "Yes" (received), the process advances to the step 434. If "No" (not received), the process advances to step 2535.

The step 434 is equivalent to that in the first embodiment. Specifically, as the brake operation instruction to the operator, the brake lamp 1120 is lit up while extinguishing the accelerator lamp 1110 on the screen 1000 of the display device 30 as shown in FIG. 12. It is also possible to output the voice 1410 from the speaker 1300 as shown in FIG. 15.

In step 2535, if the coasting operation request with the vehicle ID of the host vehicle has been transmitted from the vehicle management center system 2350, the coasting operation request reception unit 2312 receives the coasting operation request via the terminal communication unit 2310 (B5). In step 2540, the overall control unit 112 judges whether the coasting operation request has been received in the step 2535 or not. If "Yes" (received), the process advances to the step 438. If "No" (not received), the process advances to step 2545.

The step 438 is equivalent to that in the first embodiment. Specifically, as the coasting operation instruction to the operator, the accelerator lamp 1210 and the brake lamp 1120 are extinguished on the screen 1000 of the display device 30 as shown in FIG. 13. It is also possible to output the voice 1510 from the speaker 1300 as shown in FIG. 16.

In the step 2545, the overall control unit 112 judges whether there is a termination request or not. If there is no termination request, the process returns to the step 402. If there is the termination request, the process advances to step S2550. In the step 2550, a system termination process is executed. The termination request in the step 2545 can be a termination request that is inputted by the operator of the mining dump truck through the operation input unit 144 or a termination request that is properly outputted when the host vehicle reaches the end point of the route of the mining dump truck (e.g., loading site or unloading site of ore or soil), for example.

In the fleet operation management system in accordance with the third embodiment configured as above, the processes for calculating the accelerator operation timing and the brake operation timing and the management of information such as the map information, the altitude information and the surface resistance are assigned to the management center's side, while the function of giving operation instructions to the operator of each mining dump truck is assigned to the in-vehicle terminal system's side. Thus, the configuration of the in-vehicle terminal system can be simplified compared to that in the first embodiment, and the total system cost can be reduced especially when the number of mining dump trucks to be managed is large (i.e., when the number of in-vehicle terminal systems is large). Further, since the necessary types of information (map information, altitude information, surface resistance, etc.) are shared and centrally managed by the vehicle management system center, operation instructions based on the latest information can be given to each mining dump truck, which allows each mining dump truck to travel in an optimum manner from the viewpoint of reducing the fuel consumption. For example, since the surface resistance acquired by a mining dump truck at a certain position can be shared with other mining dump trucks, operation instructions based on the latest information can be given to other mining dump trucks subsequently traveling at the position.

Incidentally, while the components of the fleet operation management system are divided and assigned to the management center and the mining dump trucks as shown in FIG. 24 in this embodiment, it is of course possible to employ other types of configurations. While this embodiment has been configured to give the operation instructions to the operator of each mining dump truck via the notification means on the assumption that the system is employed for dump trucks in manned operation, the present invention is applicable also to dump trucks capable of traveling autonomously. In this case, instead of transmitting various operation requests in the steps 2420, 2425 and 2430, the traveling of each vehicle may be directly controlled on the management center's side by outputting operation signals for implementing equivalent operations to the in-vehicle terminal of each vehicle.

While the explanation of the above embodiments has been given by taking operation management systems for mining dump trucks as examples, it goes without saying that the present invention is applicable also to other types of dump trucks (other than mining dump trucks), ordinary types of vehicles, etc.

DESCRIPTION OF REFERENCE CHARACTERS

10 arithmetic processing device
20 storage device
30 display device
40 input device
51 vehicle position
52 vehicle speed
53 vehicle drive force
54 vehicle weight
100 in-vehicle terminal system
102 host vehicle speed prediction unit
104 accelerator/brake operation timing calculation unit
108 accelerator operation instruction unit
110 brake operation instruction unit
112 overall control unit (terminal)
114 route management unit (terminal)

116 host vehicle position measurement unit
118 GPS receiver
120 gyro sensor
122 accelerometer
124 speedometer
126 map matching unit
128 surface resistance storage unit
136 vehicle information storage unit
142 map data storage unit
144 operation input unit (terminal)
160 coasting operation instruction unit
162 vehicle weight measurement unit
164 surface resistance input unit
166 surface resistance estimation unit
200 mining dump truck
300 mining dump truck
600 road link table
700 surface resistance table
800 altitude information table
900 vehicle information table
1010 accelerator operation instruction lamp (lit up)
1120 brake operation instruction lamp (lit up)
1600 in-vehicle terminal system
1610 coastable distance calculation unit
1620 acceleration calculation unit
1630 display control unit
1800 screen for displaying coastable distance information or information regarding acceleration/deceleration
1900 display screen
2000 display screen
2100 display screen
2300 in-vehicle terminal system
2302 host vehicle position transmission unit
2304 vehicle ID transmission unit
2306 accelerator operation request reception unit
2308 brake operation request reception unit
2310 terminal communication unit
2312 coasting operation request reception unit
2314 route reception unit
2330 surface resistance transmission unit
2332 vehicle weight transmission unit
2350 vehicle management center system
2352 accelerator operation request transmission unit
2354 brake operation request transmission unit
2356 center communication unit
2358 host vehicle position reception unit
2360 vehicle ID reception unit
2362 overall control unit (management center)
2364 route transmission unit
2366 center operation input unit
2368 center vehicle information storage unit
2372 coasting operation request transmission unit
2374 center route management unit
2380 vehicle weight reception unit
2382 surface resistance reception unit
2600 vehicle ID-specific vehicle information table

The invention claimed is:

1. A fleet operation management system for a vehicle traveling on a predetermined travel route, comprising:
a storage unit which stores travel route information including a position, height and surface resistance of the travel route; and
a calculation unit which predicts future change in a speed of the vehicle coasting on the travel route based on a current position and current speed of the vehicle and the travel route information and judges which of acceleration, deceleration and coasting of the vehicle should be performed at the current position based on the change in the coasting speed so that a predicted speed of the vehicle after the lapse of a predetermined time will be within a predetermined range;
a display device for notifying the vehicle's driver which of depressing of the accelerator pedal, depressing of the brake pedal and releasing of the accelerator and brake pedals should be performed at the current position or at a predetermined position on the travel route based on the result of the judgment by the calculation unit;
a vehicle weight measurement unit configured to measure weight of the vehicle continuously, wherein:
the calculation unit further predicts the change in the coasting speed by further considering weight of the vehicle measured by the vehicle weight measurement unit, and change in an acceleration of the vehicle based on the change in the coasting speed, and
acceleration sections and deceleration sections calculated based on the change in the acceleration are displayed on a map that is displayed on the display device to indicate the travel route.

2. The fleet operation management system according to claim 1, wherein:
the calculation unit estimates surface resistance at the current position based on the current speed and current drive force of the vehicle, and
the surface resistance is stored in the storage unit as surface resistance at the current position.

3. The fleet operation management system according to claim 1, wherein the calculation unit predicts the change in the coasting speed by further considering weight of the vehicle.

4. The fleet operation management system according to claim 1, wherein:
the calculation unit further predicts coastable distance from the current position based on the change in the coasting speed, and
the coastable distance is displayed on the display device.

5. The fleet operation management system according to claim 1, wherein:
speed of the vehicle at each boundary between acceleration and deceleration sections is predicted, and
the predicted speed is displayed on the display device.

6. The fleet operation management system according to claim 1, wherein:
the calculation unit executes a process of extracting points at which excessive acceleration or excessive deceleration occurs in the acceleration/deceleration section, and
the display device displays a brake pedal depressing instruction at the points of excessive acceleration and an accelerator pedal depressing instruction at the points of excessive deceleration.

7. The fleet operation management system according to claim 1, wherein the calculation unit judges that the acceleration should be performed at the current position if the predicted speed of the vehicle after the lapse of the predetermined time is lower than or equal to a first threshold value, the deceleration should be performed at the current position if the predicted speed of the vehicle after the lapse of the predetermined time is higher than or equal to a second threshold value that is greater than the first threshold value, and the coasting should be performed at the current position if the predicted speed of the vehicle after the lapse of the predetermined time is higher than the first threshold value and lower than the second threshold value.

8. The fleet operation management system according to claim 1, wherein the calculation unit judges that the acceleration should be performed if a change rate of the predicted speed of the vehicle over time after the lapse of the predetermined time is lower than or equal to a third threshold value, the deceleration should be performed if the change rate is higher than or equal to a fourth threshold value, and the coasting should be performed if the change rate is higher than the third threshold value and lower than the fourth threshold value.

9. The fleet operation management system according to claim 1, further comprising an input unit for inputting the travel route.

10. The fleet operation management system according to claim 1, wherein the travel route displayed on the display device is an optimized travel route, and the vehicle's fuel efficiency is higher on the optimized travel route than on a non-optimized travel route.

11. A fleet operation management system for a vehicle traveling on a predetermined travel route, comprising:

a storage unit which stores travel route information including a position, height and surface resistance of the travel route; and a calculation unit which predicts future change in a speed of the vehicle coasting on the travel route based on a current position and current speed of the vehicle and the travel route information and judges which of acceleration, deceleration and coasting of the vehicle should be performed at the current position based on the change in the coasting speed so that a predicted speed of the vehicle after the lapse of a predetermined time will be within a predetermined range;

a display device that notifies the vehicle's driver which of depressing of the accelerator pedal, depressing of the brake pedal and releasing of the accelerator and brake pedals should be performed at the current position or at a predetermined position on the travel route based on the result of the judgment by the calculation unit, wherein the calculation unit predicts change in an acceleration of the vehicle based on the change in the coasting speed, acceleration sections and deceleration sections calculated based on the change in the acceleration are displayed on a map that is displayed on the display device to indicate an optimized travel route, and the vehicle's fuel efficiency is higher on the optimized travel route than on a non-optimized travel route.

* * * * *